(12) United States Patent
Jones et al.

(10) Patent No.: US 10,577,853 B2
(45) Date of Patent: Mar. 3, 2020

(54) SYSTEMS AND METHODS FOR CONTROLLING THE OPERATION OF A MOVABLE PANEL WALL SYSTEM

(71) Applicant: Modernfold, Inc., Greenfield, IN (US)

(72) Inventors: Bradley A. Jones, Anderson, IN (US); Bryan Thomas Welch, Noblesville, IN (US); Michael W. Beeler, Anderson, IN (US); Jonathan Taylor Dreitlein, Indianapolis, IN (US); William S. Meyers, Fishers, IN (US)

(73) Assignee: MODERNFOLD, INC., Greenfield, IN (US)

( * ) Notice: Subject to any disclaimer, the term of this patent is extended or adjusted under 35 U.S.C. 154(b) by 141 days.

(21) Appl. No.: 15/586,438

(22) Filed: May 4, 2017

(65) Prior Publication Data
US 2017/0321469 A1  Nov. 9, 2017

Related U.S. Application Data

(60) Provisional application No. 62/333,235, filed on May 8, 2016.

(51) Int. Cl.
| | | |
|---|---|---|
| *E05F 15/74* | (2015.01) | |
| *E05F 15/605* | (2015.01) | |
| *E05F 15/643* | (2015.01) | |
| *E04B 2/72* | (2006.01) | |
| *E04B 2/82* | (2006.01) | |
| *E05D 15/06* | (2006.01) | |
| *E06B 3/01* | (2006.01) | |

(Continued)

(52) U.S. Cl.
CPC .............. *E05F 15/74* (2015.01); *E04B 2/721* (2013.01); *E04B 2/827* (2013.01); *E05D 15/0626* (2013.01); *E05F 15/605* (2015.01); *E05F 15/643* (2015.01); *E06B 3/01* (2013.01); *G06F 3/04847* (2013.01); *G06F 3/04883* (2013.01); *H04N 7/181* (2013.01); *E05F 2015/434* (2015.01); *E05Y 2400/818* (2013.01); *E05Y 2400/82* (2013.01); *E05Y 2400/85* (2013.01); *E05Y 2900/142* (2013.01)

(58) Field of Classification Search
CPC ....... E05F 15/74; E05F 15/643; E05F 15/605; H04N 7/181; G06F 3/04883; E04B 2/827; E04B 2/721; E06B 3/01; E06B 7/28; E05D 15/0626

See application file for complete search history.

(56) References Cited

U.S. PATENT DOCUMENTS

| | | |
|---|---|---|
| 3,654,732 A | 4/1972 | Schacht |
| 3,810,330 A | 5/1974 | Daggy |

(Continued)

OTHER PUBLICATIONS

International Preliminary Report on Patentability issued by the European Patent Office, dated Nov. 13, 2018, for PCT/US2017/030977, 12 pages.

(Continued)

*Primary Examiner* — Beth A Stephan
(74) *Attorney, Agent, or Firm* — Faegre Baker Daniels LLP

(57) ABSTRACT

A movable wall panel system is disclosed. The movable wall panel system may include at least one monitoring system to monitor at least one area adjacent the movable wall panel system. The movable wall panel system may include a touch screen as part of an operator interface.

20 Claims, 21 Drawing Sheets

(51) Int. Cl.
*G06F 3/0484* (2013.01)
*G06F 3/0488* (2013.01)
*H04N 7/18* (2006.01)
*E05F 15/43* (2015.01)

(56) References Cited

U.S. PATENT DOCUMENTS

| | | |
|---|---|---|
| 5,152,332 A | 10/1992 | Siener |
| 5,244,030 A | 9/1993 | Cole et al. |
| 5,548,926 A | 8/1996 | Sjoholm |
| 5,551,499 A | 9/1996 | McRoberts |
| 5,749,172 A | 5/1998 | Isopahkala |
| 6,393,772 B1 | 5/2002 | McRoberts et al. |
| 6,571,855 B1 | 6/2003 | Goldsmith et al. |
| 6,598,355 B2 | 7/2003 | Owens |
| 6,630,755 B2 | 10/2003 | Petriello |
| 6,698,491 B2 | 3/2004 | Goldsmith et al. |
| 6,715,530 B2 | 4/2004 | Goldsmith et al. |
| 7,228,664 B2 | 6/2007 | Clark |
| 7,255,045 B2 | 8/2007 | Owens |
| 7,737,860 B2 * | 6/2010 | Banta .................. E06B 9/68 |
| | | 318/466 |
| 2004/0069420 A1 | 4/2004 | Petriello |
| 2004/0107639 A1 | 6/2004 | Mullet |
| 2007/0204527 A1 | 9/2007 | Clark |
| 2010/0300628 A1 | 12/2010 | Cole et al. |
| 2011/0067822 A1 | 3/2011 | Cole et al. |
| 2012/0083147 A1 | 4/2012 | Welch et al. |
| 2012/0180390 A1 * | 7/2012 | Goodman .............. E06B 9/68 |
| | | 49/13 |
| 2012/0325412 A1 * | 12/2012 | Goodman ............. E05D 15/26 |
| | | 160/84.02 |
| 2013/0008618 A1 * | 1/2013 | Hall ...................... H02P 7/2913 |
| | | 160/138 |
| 2013/0220558 A1 * | 8/2013 | Knight ................... E05F 15/76 |
| | | 160/206 |
| 2014/0059933 A1 | 3/2014 | Jones et al. |
| 2014/0224433 A1 * | 8/2014 | Goodman .............. E05D 15/06 |
| | | 160/127 |

OTHER PUBLICATIONS

Intrusion Alarm System, *DS720i Long Range TriTech PIR Detector (10.525 GHz)*, www.boschsecurity.com, security.sales@us.bosch.com, Bosch Security Systems, Inc. 2016, V4.01, Jul. 2016, 4 pages.

Board of Educational Services of New York State, *Electrically Operated Partitions & Safety Devices, NYSED Requirements and Regulations*, SafePath, at least as early as May 7, 2016, 70 pages.

Partial International Search Report issued by the European Patent Office, dated Aug. 14, 2017, for International Application No. PCT/US2017/030977; 13 pages.

International Search Report and Written Opinion of the International Searching Authority issued by the European Patent Office, dated Oct. 13, 2017, for International Application No. PCT/US23017/030977, 18 pages.

Moveo, The intelligent solution for flexible space utilization, (see for example, "The premium operating system: Comfortdrive" on p. 13 (internal numbering of brochure)), Sep. 2010 (13 pages).

Moveo Comfortdrive, May 2013, (16 pages).

Hufcor Owner's Manual Type 11 & 42, (see for example, "Hufgard Safety System" on p. 4 of brochure), 2000, (12 pages).

* cited by examiner

SYSTEMS AND METHODS FOR CONTROLLING THE OPERATION OF A MOVABLE PANEL WALL SYSTEM

RELATED APPLICATION

The present application claims the benefit of U.S. Provisional Application No. 62/333,235, filed May 8, 2016, titled SYSTEMS AND METHODS FOR CONTROLLING THE OPERATION OF A MOVEABLE PANEL WALL SYSTEM, the entire disclosure of which is expressly incorporated by reference herein.

BACKGROUND AND SUMMARY

The present disclosure relates to movable panel wall systems operable to partition a large environment, such as rooms, into a plurality of smaller environments. More particularly, the present disclosure relates to a movable wall panel system having a plurality of panels movable between an extended configuration and a retracted configuration and a monitoring system to monitor at least one area adjacent the movable wall panel system.

Movable wall panel systems find useful applications in a variety of venues such as classrooms, offices, convention facilities, hospitals or the like. In these venues, the panels of the movable wall panel system are often moved along overhead tracks from which the panels are suspended. The partitions are movable along the tracks to separate or compartmentalize larger rooms or areas into smaller rooms or areas. The operable partitions are typically connected to trolleys that roll within the overhead track. The track is suspended from a support structure which is typically located above the ceiling of a room or area in which the operable partitions are installed.

Operable partitions are typically available in single panel, paired panel, and continuously hinged arrangements. Continuously hinged panels are connected together in a train so that the panels extend as one complete unit. A drive system is connected to a trolley of a lead panel to move the train of panels.

In an exemplary embodiment of the present disclosure, a system which monitors for an object adjacent a movable wall panel system suspended from an overhead track is provided. The monitoring system comprising a plurality of wall panels rotatably coupled together and each including a first end and a second end, spaced-apart from the first end, and a panel face extending between the first end and the second end, the plurality of wall panels being movable between an extended configuration wherein the panel faces of the plurality of wall panels are generally coplanar with a wall plane and a retracted configuration wherein the panel faces of the plurality of wall panels are transverse to the wall plane; a drive system coupled to at least one of the plurality of wall panels to move the plurality of wall panels along the overhead track to one of the extended configuration and the retracted configuration; and a control system coupled to drive system to control the drive system to move the plurality of wall panels to one of the extended configuration and the retracted configuration and to deactivate the drive system. The control system comprising at least one monitoring system positioned to monitor at least one area adjacent the plurality of wall panels on a first side of the wall plane, the at least one monitoring system adapted to detect the object in the least one area, the at least one monitoring system providing a monitoring output indicating the detection of the object in the least one area; an operator interface positioned on a second side of the wall plane, the operator interface capable of receiving a request to move the plurality of wall panels to one of the extended configuration and the retracted configuration, the operator interface providing a request output indicating the request to move the plurality of wall panels to one of the extended configuration and the retracted configuration; and a controller operatively coupled to the at least one monitoring system to receive the monitoring output and the operator interface to receive the request output, the controller activating the drive system based on the request output and the monitoring output and deactivating the drive system based on the monitoring output, the operator interface including a touch screen interface.

In an example thereof, the operator interface includes a first touch input, the operator interface providing an extend request output to extend the plurality of wall panels in response to a detection of a touch of the first touch input for at least a predetermined period of time.

In another example thereof, the operator interface includes a first touch input, the operator interface providing an extend request output to extend the plurality of wall panels in response to a detection of a touch of the first touch input and a stop request output in response to a detection of an absence of the touch of the first touch input.

In a further example thereof, the operator interface includes a second touch input, the operator interface providing a retract request output to retract the plurality of wall panels in response to a detection of a touch of the second touch input for at least a predetermined period of time.

In yet another example thereof, the operator interface includes a second touch input, the operator interface providing a retract request output to retract the plurality of wall panels in response to a detection of a touch of the second touch input and a stop request output in response to a detection of an absence of the touch of the second touch input.

In still another example thereof, the operator interface is completely positioned on the second side of the wall plane.

In yet still another example thereof, the operator interface includes a first unit having a touch screen positioned on the first side of the wall plane and a second unit having a second touch screen positioned on the second side of the wall plane, the first unit and the second unit each being operatively coupled to the controller, the controller operating the drive system based on either a first request output from the first unit or a second request output from the second unit.

In still a further example thereof, the at least one monitoring system includes a first monitoring system positioned to monitor a first area on the first side of the wall plane and a second monitoring system positioned to monitor one of a second area on the second side of the wall plane, a third area intersecting the wall plane, and a fourth area corresponding to a stacking location of the plurality of wall panels when the plurality of wall panels are in the retracted configuration. In a variation thereof, the second monitoring system monitors the third area and is carried by a leading wall panel of the plurality of wall panels.

In still yet a further example thereof, the at least one monitoring system includes a first monitoring system positioned to monitor the first area on the first side of the wall plane, the first monitoring system including a video camera. In a variation thereof, a video output of the video camera is displayed at the operator interface positioned on the second side of the wall plane.

In yet still another example, the at least one monitoring system includes a first monitoring system positioned to monitor a first area on the first side of the wall plane and a second monitoring system positioned to monitor a second area on the second side of the wall plane, the first monitoring system including a first video camera and the second monitoring system including a second video camera. In a variation thereof, a first video output of the first video camera and a second video output of the second video camera are displayed at the operator interface positioned on the second side of the wall plane.

In still another example thereof, the operator interface includes a third touch input, the operator interface providing a stop request output to stop movement of the plurality of wall panels in response to a detection of a touch of the third touch input for at least a predetermined period of time.

In a further example thereof, the operator interface is activated through receipt of a user specific input. In a variation thereof, the user specific input is a password entered through the touch screen. In another variation thereof, the operator interface is deactivated after a predetermined period of time of inactivity.

In yet a further example thereof, the at least one monitoring system includes a first monitoring system positioned to monitor a first area on the first side of the wall plane, a second monitoring system positioned to monitor a second area on the second side of the wall plane, a third monitoring system positioned to monitor a third area intersecting the wall plane, and a fourth monitoring system positioned to monitor a fourth area corresponding to a stacking location of the plurality of wall panels when the plurality of wall panels are in the retracted configuration.

In yet still a further example thereof, the touch screen is configured to present a plurality of screen layouts, a first screen layout of the plurality of screen layouts being capable of receiving a user specific input and in response to the controller determining the user specific input is valid, the touch screen interface displays a second screen layout of the plurality of screen layouts, the second screen layout including a wall movement request touch region, the operator interface providing the request output in response to a selection of the wall movement request touch region.

In still a further example, the request output is received by the controller only from the operator interface positioned on the second side of the wall plane.

In another exemplary embodiment of the present disclosure a system which monitors for an object adjacent a movable wall panel system suspended from an overhead track is provided. The monitoring system comprising a plurality of wall panels rotatably coupled together and each including a first end and a second end, spaced-apart from the first end, and a panel face extending between the first end and the second end, the plurality of wall panels being movable between an extended configuration wherein the panel faces of the plurality of wall panels are generally coplanar with a wall plane and a retracted configuration wherein the panel faces of the plurality of wall panels are transverse to the wall plane; a drive system coupled to at least one of the plurality of wall panels to move the plurality of wall panels along the overhead track to one of the extended configuration and the retracted configuration; and a control system coupled to drive system to control the drive system to move the plurality of wall panels to one of the extended configuration and the retracted configuration and to deactivate the drive system. The control system comprising at least one monitoring system positioned to monitor at least one area adjacent the plurality of wall panels on a first side of the wall plane, the at least one monitoring system adapted to detect the object in the least one area, the at least one monitoring system providing a monitoring output indicating the detection of the object in the least one area, wherein the at least one monitoring system includes a first monitoring system positioned to monitor the first area on the first side of the wall plane, the first monitoring system including a video camera; an operator interface positioned on a second side of the wall plane, the operator interface capable of receiving a request to move the plurality of wall panels to one of the extended configuration and the retracted configuration, the operator interface providing a request output indicating the request to move the plurality of wall panels to one of the extended configuration and the retracted configuration; and a controller operatively coupled to the at least one monitoring system to receive the monitoring output and the operator interface to receive the request output, the controller activating the drive system based on the request output and the monitoring output and deactivating the drive system based on the monitoring output.

In an example thereof, a video output of the video camera is displayed on a display at the operator interface positioned on the second side of the wall plane.

In a further example thereof, the operator interface includes a touch screen and a video output of the video camera is displayed on the touch screen.

In another example thereof, the at least one monitoring system further includes a second monitoring system positioned to monitor a second area on the second side of the wall plane, the second monitoring system including a second video camera, wherein a first video output of the video camera and a second video output of the second video camera are displayed at the operator interface positioned on the second side of the wall plane.

In a further exemplary embodiment, a method of operating a movable wall panel system suspended from an overhead track, the movable wall panel system including a plurality of wall panels rotatably coupled together and each including a first end and a second end, spaced-apart from the first end, and a panel face extending between the first end and the second end, the plurality of wall panels being movable between an extended configuration wherein the panel faces of the plurality of wall panels are generally coplanar with a wall plane and a retracted configuration wherein the panel faces of the plurality of wall panels are transverse to the wall plane. The method comprising the steps of providing at least one monitoring system on a first side of the wall plane to monitor a first area on the first side of the wall plane for an object in the first area; providing an operator interface on a second side of the wall plane, the operator interface including a touch screen; receiving through the operator interface a request to move to plurality of movable wall panels to one of the extended configuration and the retracted configuration; and in the absence of receiving an indication from the at least one monitoring system of a presence of the object, moving the plurality of movable wall panels towards the requested one of the extended configuration and the retracted configuration in response to receiving the request to move the plurality of movable wall panels.

In an example thereof, the method further comprises the step of subsequently stopping a movement of the plurality of movable wall panels in response to an absence of the request to move the plurality of movable wall panels.

In a still further exemplary embodiment, a method of operating a movable wall panel system suspended from an overhead track, the movable wall panel system including a plurality of wall panels rotatably coupled together and each including a first end and a second end, spaced-apart from the first end, and a panel face extending between the first end and the second end, the plurality of wall panels being movable between an extended configuration wherein the panel faces of the plurality of wall panels are generally coplanar with a wall plane and a retracted configuration wherein the panel faces of the plurality of wall panels are transverse to the wall plane. The method comprising the steps of providing at least one monitoring system on a first side of the wall plane to monitor a first area on the first side of the wall plane for an object in the first area, the at least one monitoring system including a video camera; providing an operator interface on a second side of the wall plane; displaying at the operator interface a video output of the video camera; receiving through the operator interface a request to move to plurality of movable wall panels to one of the extended configuration and the retracted configuration; and in the absence of receiving an indication from the at least one monitoring system of a presence of the object, moving the plurality of movable wall panels towards the requested one of the extended configuration and the retracted configuration in response to receiving the request to move the plurality of movable wall panels.

In an example thereof, the method further comprises the step of subsequently stopping a movement of the plurality of movable wall panels in response to an absence of the request to move the plurality of movable wall panels.

In a yet still further exemplary embodiment, a method of operating a movable wall panel system suspended from an overhead track, the movable wall panel system including a plurality of wall panels rotatably coupled together and each including a first end and a second end, spaced-apart from the first end, and a panel face extending between the first end and the second end, the plurality of wall panels being movable between an extended configuration wherein the panel faces of the plurality of wall panels are generally coplanar with a wall plane and a retracted configuration wherein the panel faces of the plurality of wall panels are transverse to the wall plane. The method comprising the steps of providing a video camera positioned on a first side of the wall plane, the video camera monitoring a first area adjacent the plurality of wall panels; providing an operator interface positioned on a second side of the wall plane, the operator interface configured to receive a request to move to plurality of movable wall panels to one of the extended configuration and the retracted configuration; and displaying on a display positioned on the second side of the wall plane a video output of the video camera.

In an example thereof, the display is part of the operator interface.

In still another exemplary embodiment of the present disclosure, a movable wall panel system suspended from an overhead track is provided. The movable wall panel system comprising a plurality of wall panels rotatably coupled together and each including a first end and a second end, spaced-apart from the first end, and a panel face extending between the first end and the second end. The plurality of wall panels being movable between an extended configuration wherein the panel faces of the plurality of wall panels are generally coplanar and non-overlapping and a retracted configuration wherein the panel faces of the plurality of wall panels are generally parallel and overlapping. The movable wall panel system further comprising a drive system coupled to at least one of the plurality of wall panels to move the plurality of wall panels along the overhead track to one of the extended configuration and the retracted configuration and a control system coupled to drive system to control the drive system to move the plurality of wall panels towards one of the extended configuration and the retracted configuration. The control system comprising an operator interface including a touch screen configured to present a plurality of screen layouts, the operator interface capable of receiving a request to move the plurality of wall panels to one of the extended configuration and the retracted configuration through the touch screen. The operator interface providing a request output indicating the request to move the plurality of wall panels to one of the extended configuration and the retracted configuration. The control system further comprising a controller operatively coupled to the operator interface to receive the request output. The controller operating the drive system based on the request output. The touch screen of the operator interface displays a first screen layout of the plurality of screen layouts being capable of receiving a user specific input and in response to the controller determining the user specific input is valid the touch screen interface of the operator interface displays a second screen layout of the plurality of screen layouts, the second screen layout including a wall movement request touch region and the controller moves the plurality of wall panels in response to a selection of the wall movement request touch region.

In an example thereof, the touch screen interface of the operator interface displays a third screen layout prior to the second screen layout, the third screen layout including an instructional box, a decline touch region, and an accept touch region, the second screen layout only being displayable by the touch screen if a selection of the accept touch region is received.

In another example thereof, the touch screen displays during a movement of the plurality of wall panels an indication of a position of the plurality of wall panels on the touch screen. In a variation thereof, the wall movement request touch region is an extend wall movement request touch region and the controller moves the plurality of wall panels towards the extended configuration in response to a selection of the extend wall movement request touch region. In another variation thereof, the wall movement request touch region is a retract wall movement request touch region and the controller moves the plurality of wall panels towards the retracted configuration in response to a selection of the retract wall movement request touch region.

In yet another exemplary embodiment of the present disclosure, a method of operating a movable wall panel system suspended from an overhead track is provided. The movable wall panel system includes a plurality of wall panels, each of the wall panels including a first end and a second end, spaced-apart from the first end, and a panel face extending between the first end and the second end. The plurality of wall panels being movable between an extended configuration wherein the panel faces of the plurality of wall panels are generally coplanar and non-overlapping and a retracted configuration wherein the panel faces of the plurality of wall panels are generally parallel and overlapping. The movable wall panel system further comprises an operator interface including a touch screen configured to present a plurality of screen layouts. The method comprising the steps of presenting a first screen layout of the plurality of screen layouts on the touch screen, the first screen layout including at least one input to receive an operator identification; receiving a user specific input through the at least one input of the first screen layout; determining in the received user specific input is valid; if the received user specific input is valid, presenting a second screen layout of the plurality of screen layouts, the second screen layout including a wall movement request touch region; receiving a selection of the wall movement request touch region; and moving the plurality of wall panels in response to receiving the selection of the wall movement request.

In yet still another exemplary embodiment of the present disclosure, a movable wall panel system suspended from an overhead track is provided. The movable wall panel system comprising a plurality of wall panels rotatably coupled together and each including a first end and a second end, spaced-apart from the first end, and a panel face extending between the first end and the second end. The plurality of wall panels being movable between an extended configuration wherein the panel faces of the plurality of wall panels are generally coplanar and non-overlapping and a retracted configuration wherein the panel faces of the plurality of wall panels are generally parallel and overlapping. The system further comprising a drive system coupled to at least one of the plurality of wall panels to move the plurality of wall panels along the overhead track to one of the extended configuration and the retracted configuration and a control system coupled to drive system to control the drive system to move the plurality of wall panels to one of the extended configuration and the retracted configuration. The control system comprising an operator interface including a touch screen configured to present a plurality of screen layouts, the operator interface capable of receiving a request to move the plurality of wall panels to one of the extended configuration and the retracted configuration through the touch screen, the operator interface providing a request output indicating the request to move the plurality of wall panels towards one of the extended configuration and the retracted configuration; and a controller operatively coupled to the operator interface to receive the request output, the controller operating the drive system based on the request output, wherein the request to move the plurality of wall panels is a detection of a touch of a wall movement request touch region displayed on the touch screen, the controller moves the plurality of movable panels towards one of the extended configuration and the retracted configuration as long as the touch of the wall movement request touch region is detected.

In still yet another exemplary embodiment of the present disclosure, a method of operating a movable wall panel system suspended from an overhead track is provided. The movable wall panel system including a plurality of wall panels, each of the wall panels including a first end and a second end, spaced-apart from the first end, and a panel face extending between the first end and the second end. The plurality of wall panels being movable between an extended configuration wherein the panel faces of the plurality of wall panels are generally coplanar and non-overlapping and a retracted configuration wherein the panel faces of the plurality of wall panels are generally parallel and overlapping. The movable wall panel system further comprising an operator interface including a touch screen configured to present a wall movement request touch region. The method comprising the steps of receiving a wall movement request through the operator interface by detecting a touch of the wall movement request touch region; and moving the plurality of wall panels towards one of the extended configuration and the retracted configuration in response to the touch of the wall movement request touch region as long as the touch of the wall movement request touch region is detected.

In yet still a further exemplary embodiment of the present disclosure, a method of operating a movable wall panel system suspended from an overhead track is provided. The movable wall panel system includes a plurality of wall panels, each of the wall panels including a first end and a second end, spaced-apart from the first end, and a panel face extending between the first end and the second end. The plurality of wall panels being movable between an extended configuration wherein the panel faces of the plurality of wall panels are generally coplanar and non-overlapping and a retracted configuration wherein the panel faces of the plurality of wall panels are generally parallel and overlapping. The movable wall panel system further comprises an operator interface including a touch screen configured to present a wall movement request touch region. The method comprising the steps of receiving a wall movement request through the operator interface by detecting a touch of the wall movement request touch region; displaying an indication of a position of the plurality of wall panels on the touch screen; moving the plurality of wall panels in response to the touch of the wall movement request touch region; and updating the indication of the position of the plurality of wall panels on the touch screen as the plurality of wall panels are moving.

BRIEF DESCRIPTION OF THE DRAWINGS

The detailed description particularly refers to the accompanying figures in which.

Figure 1:
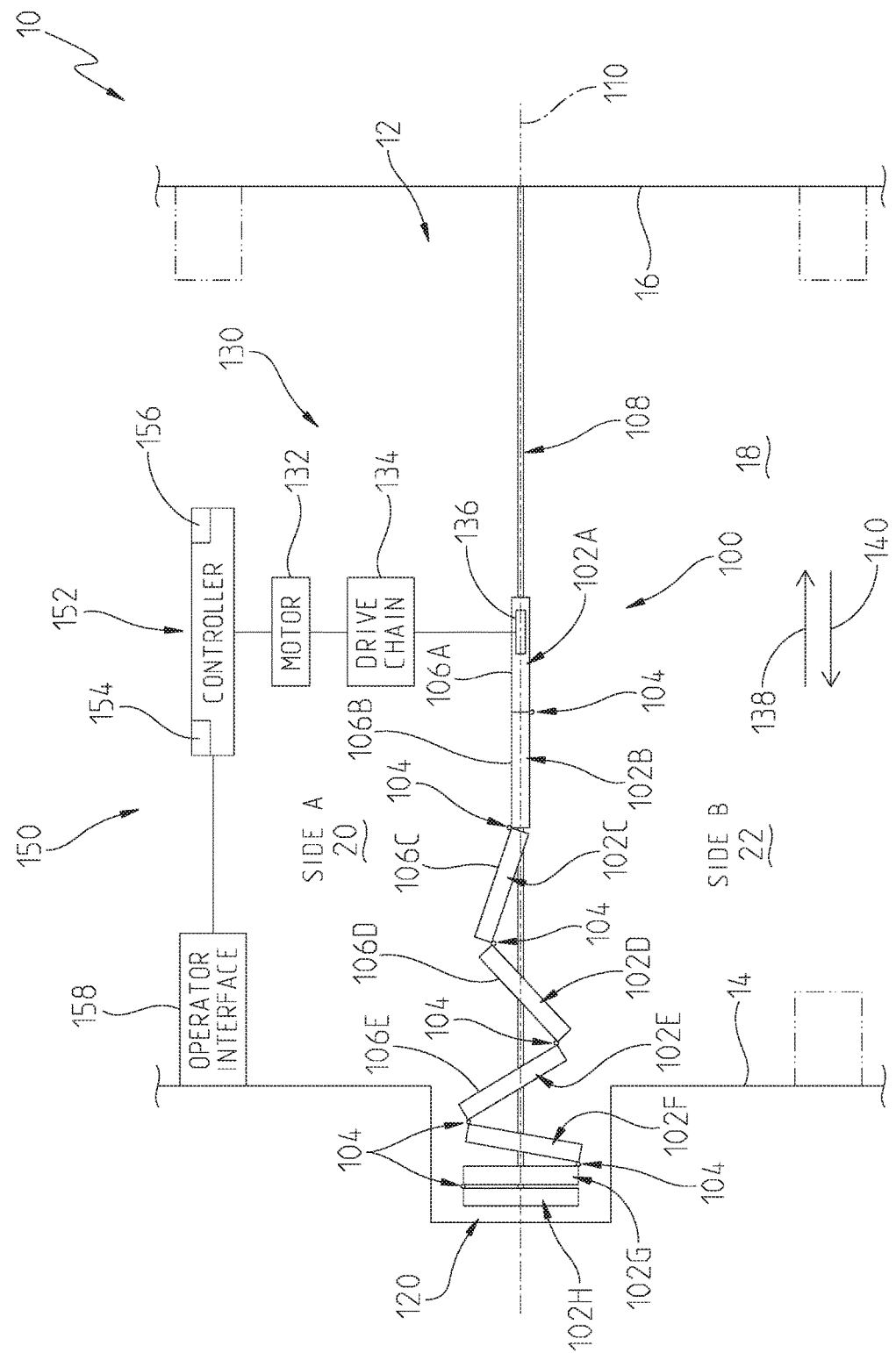
FIG. 1 illustrates a top view of an exemplary movable wall system having a plurality of movable wall panels suspended from an overhead track in an environment.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates exemplary embodiments of the disclosure, in various forms, and such exemplifications are not to be construed as limiting the scope of the disclosure in any manner.

DETAILED DESCRIPTION OF THE DRAWINGS

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. The present systems and methods include any alterations and further modifications of the illustrated devices and described methods and further applications of the principles of the present disclosure which would normally occur to one skilled in the art to which the present disclosure relates. Corresponding reference characters indicate corresponding parts throughout the several views.

The present disclosure relates to movable wall systems 100 for use in an environment 10 such as in a room 12 of a building. Referring to FIG. 1, environment 10 includes a first wall 14, a second spaced apart wall 16, a floor 18, and a ceiling (not shown).

Movable wall system 100 includes a plurality of wall panels 102, illustratively 102A-102H, rotatably coupled together at respective hinge joints 104. Each wall panel 102 includes a first end and a second end, spaced-apart from the first end, and a panel face 106 extending between the first end and the second end. The plurality of wall panels 102 are suspended from an overhead track 108 generally positioned within the ceiling of the room 12. Overhead track 108 intersects a vertical plane 110 along which movable wall system 100 is positioned when extended between wall 14 and wall 16. The plurality of wall panels 102 are movable between an extended configuration wherein the panel faces 106 of the plurality of wall panels are generally coplanar and parallel to plane 110 and a retracted configuration wherein the panel faces 106 of the plurality of wall panels 102 are transverse to the plane 110. The plurality of wall panels 102 are movable between an extended configuration wherein the panel faces 106 of the plurality of wall panels are non-overlapping and generally parallel and a retracted configuration wherein the panel faces 106 of the plurality of wall panels 102 overlapping and generally parallel. In one example, generally parallel means within about 5 degrees of being parallel. In the illustrated embodiment, wall panels 102 extend from wall 14 to wall 16 when movable wall system 100 is in the extended position and wall panels 102 are stored in a pocket 120 in wall 14 when movable wall system 100 is in the retracted position. Exemplary panels 106 include seals between adjacent panels 106, seals between panels 106 and the ceiling of room 12, seals between panels 106 and floor 18 of room 12.

Movable wall system 100 is driven between the extended configuration and the retracted configuration through a drive system 130. Drive system 130 includes a motor 132 and a chain drive 134. Chain drive 134 is operatively coupled to a trolley support 136 coupled to lead panel 102A. Each panel includes one or more trolley supports 136 which are received in overhead track 108 and are constrained to move within overhead track 108. Motor 132 actuates chain drive 134 to either pull lead panel 102A in either direction 138 to extend movable wall system 100 or direction 140 to retract movable wall system 100.

Details regarding exemplary panels and drive systems are provided in U.S. Pat. Nos. 7,255,045; 6,715,530; 6,698,491; 6,598,355; 6,571,855; 6,393,772; 5,551,499; and 5,152,332 and in U.S. Published Patent Application Nos. 20140059933 and 20120083147, the entire disclosures of which are expressly incorporated by reference herein.

Drive system 130 is controlled through a control system 150. Control system 150 includes a controller 152 and an operator interface 158. Controller 152 includes a processor 154 and associated non-transitory memory 156. Controller 152 provides the electronic control of the various components of drive system 130. Controller 152 receives an indication from an extend limit switch 160 (see FIG. 3) when movable wall system 100 approaches a fully extended configuration and deactivates motor 132. Similarly, controller 152 receives an indication from a retract limit switch 162 when movable wall system 100 approaches a fully retracted configuration and deactivates motor 132.

Further, as described in more detail herein, controller 152 is operatively coupled to a plurality of monitoring systems which monitor various parameters of movable wall system 100 or the environment 10 surrounding movable wall system 100. Controller 152 may be a single device or a distributed device, and the functions of controller 152 may be performed by hardware and/or as computer instructions on a non-transitory computer readable storage medium, such as memory 156.

When movable wall system 100 is positioned in an extended configuration, room 12 is separated into a first region 20 (SIDE A) and a second region 22 (SIDE B). As illustrated in FIG. 1, operator interface 158 is positioned on wall 14 in first region 20. Operator interface 158 may be positioned on wall 14 in second region 22, on wall 16 in first region 20, or wall 16 in second region 22. An operator provides input to controller 152 through operator interface 158. Exemplary input includes a request to extend movable wall system 100 and a request to retract movable wall system 100. In the embodiments disclosed herein a single operator interface 158 is provided. Thus, a single operator may actuate movable wall system 100 from a single side of movable wall system 100. In alternative embodiments, two or more operator interface 158 are provided with at least one in first region 20 and at least one in second region 22.

Figure 2:
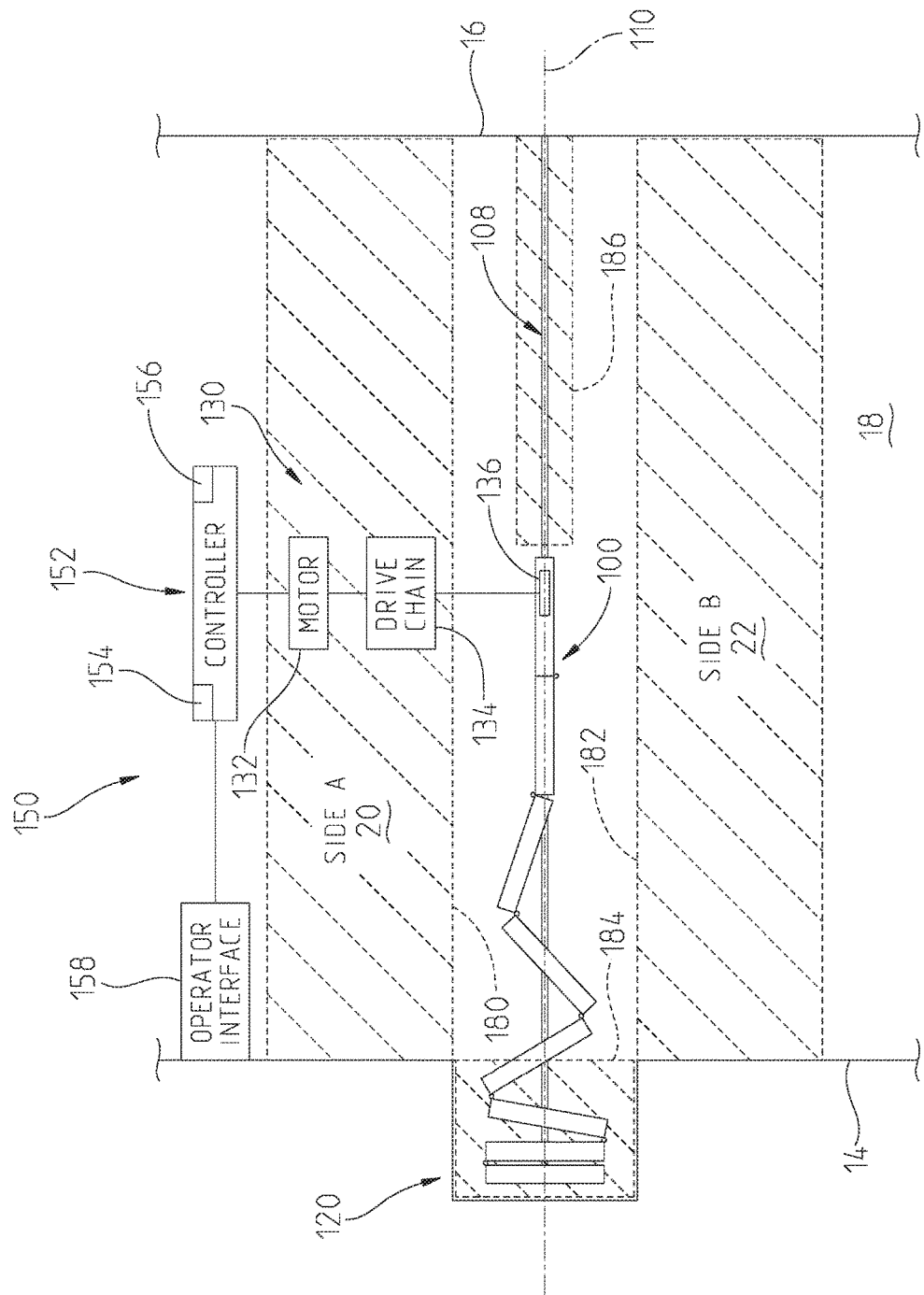
FIG. 2 illustrates the top view of FIG. 1 and identifies a plurality of monitoring regions adjacent to the plurality of movable wall panels for monitoring for the presence of an object.

Referring to FIG. 2, several regions adjacent to movable wall system 100 may be monitored to detect one or more objects that approach movable wall system 100. A first region 180 is provided between walls 14 and 16 in first region 20 which generally extends from wall 14 to wall 16. A second region 182 is provided between walls 14 and 16 in second region 22 which generally extends from wall 14 to wall 16. A third region 184 corresponds to an area whereat wall panels 102 are stacked, illustratively pocket 120. A fourth region 186 corresponds to an area between wall 16 and leading panel 102A of movable wall system 100. In one embodiment, operator interface 158 is positioned outside of regions 180, 182, 184, and 186. In one example, region 180 is positioned between wall 100 and operator interface 158.

Figure 3:
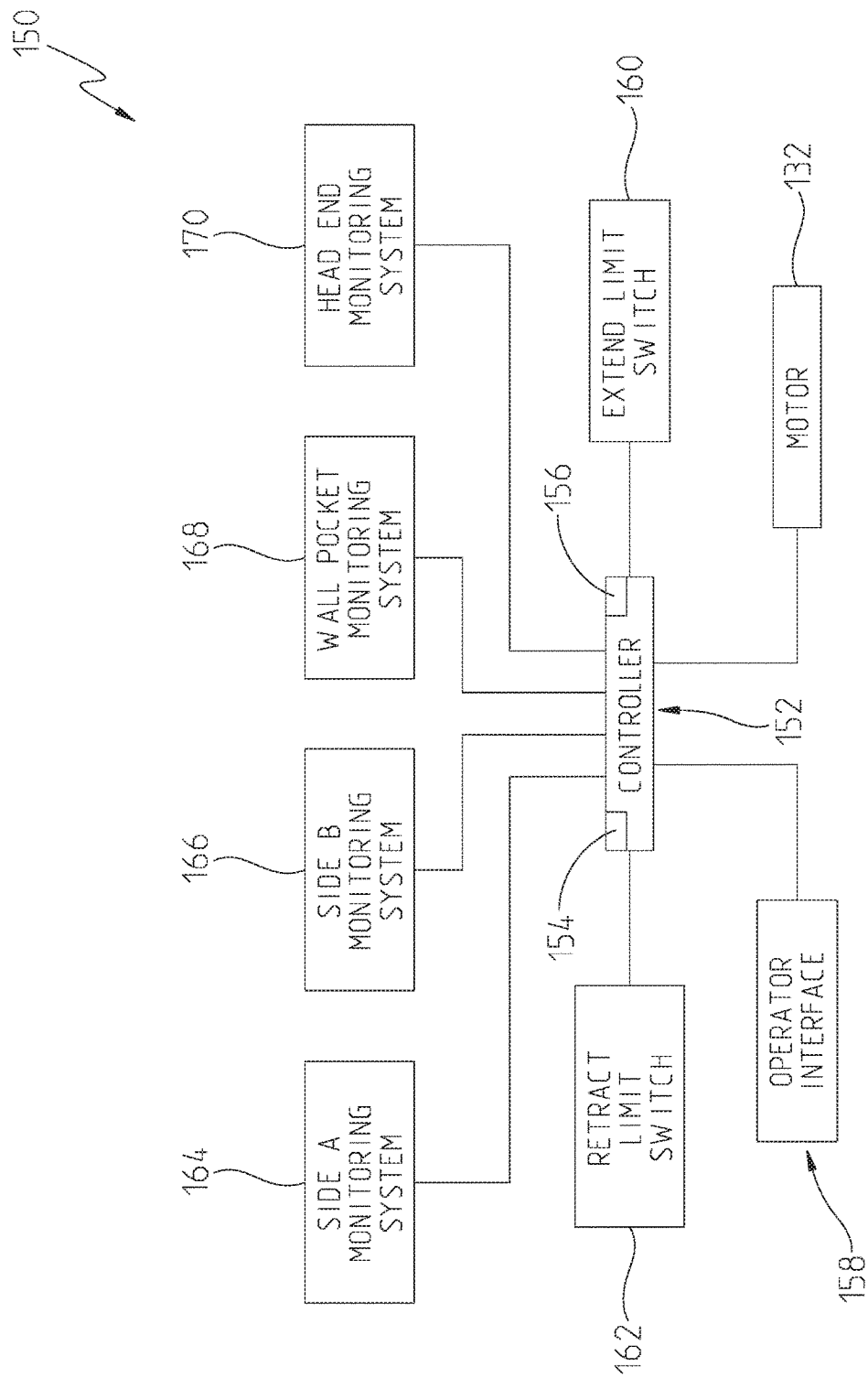
FIG. 3 illustrates an exemplary control system of the movable wall system of FIG. 1 including monitoring systems to monitor the monitoring regions adjacent to the plurality of movable wall panels.

Referring to FIG. 3, control system 150 further includes a first monitoring system 164 which monitors first region 180, a second monitoring system 166 which monitors second region 182, a third monitoring system 168 which monitors third region 184, and a fourth monitoring system 170 which monitors fourth region 186. Each of first monitoring system 164, second monitoring system 166, third monitoring system 168, and fourth monitoring system 170 may include two or more systems which monitor separate non-overlapping portions of the respective first region 180, second region 182, third region 184, and fourth region 186 or monitor overlapping portions of the respective first region 180, second region 182, third region 184, and fourth region 186. Exemplary first monitoring system 164, second monitoring system 166, third monitoring system 168, and fourth monitoring system 170 include pressure sensitive mats which provide an indication when a load exceeding a threshold amount is placed on the mat, passive infrared ("IR") detection systems which provide an indication of either the presence of a warm object in a field of view of the detector or a change in a location of warm object in the field of view of the detector, a pressure switch carried by a leading edge of lead panel 102A, an ultrasonic system which detects an object based on the timing of reflected acoustic signals, a visible light video camera, line-of-sight systems, and other suitable systems for detecting the presence of an object in one of first region 180, second region 182, third region 184, and fourth region 186.

Figure 4:
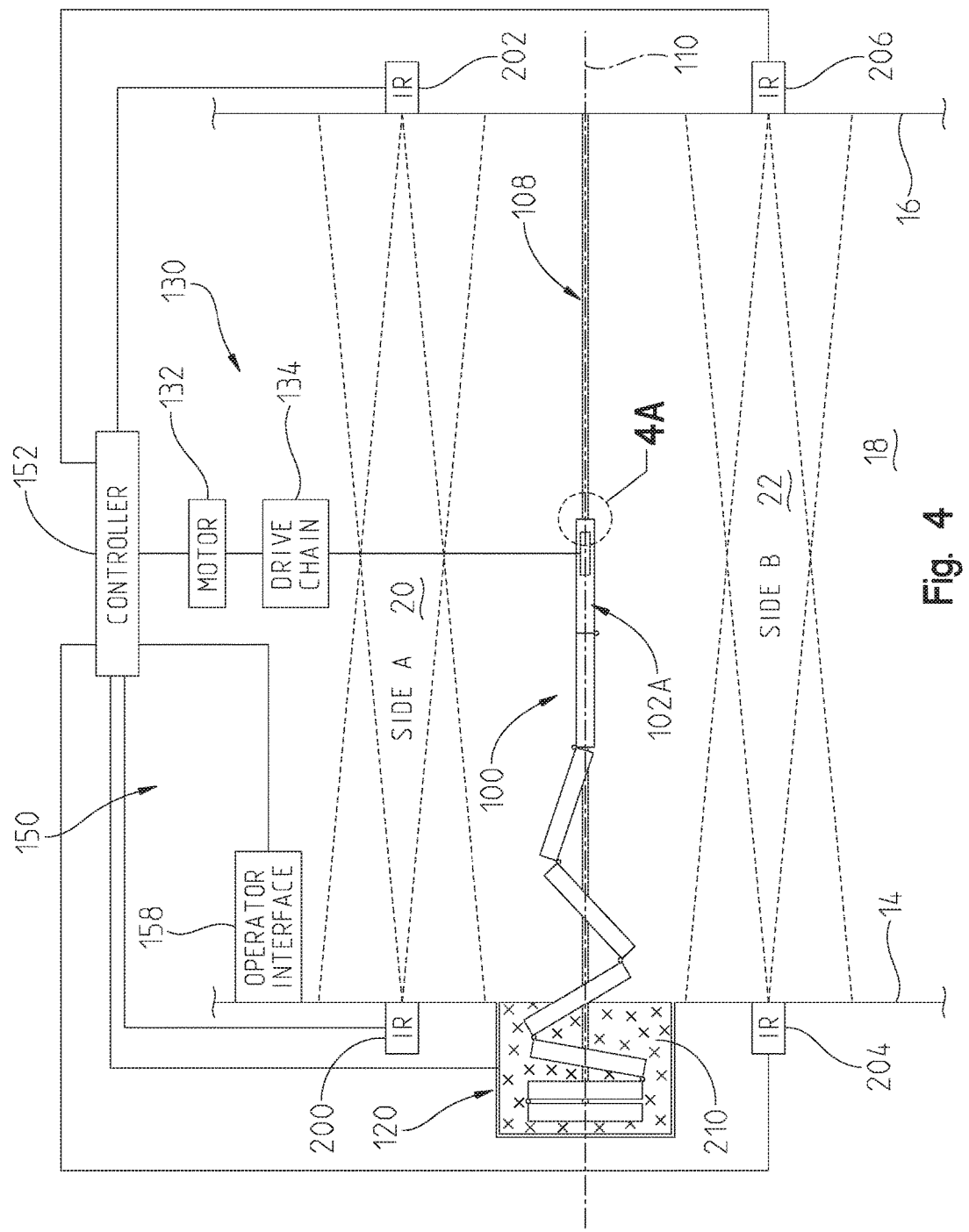
FIG. 4 illustrates an exemplary embodiment of the control system of FIG. 3.
Figure 4A:
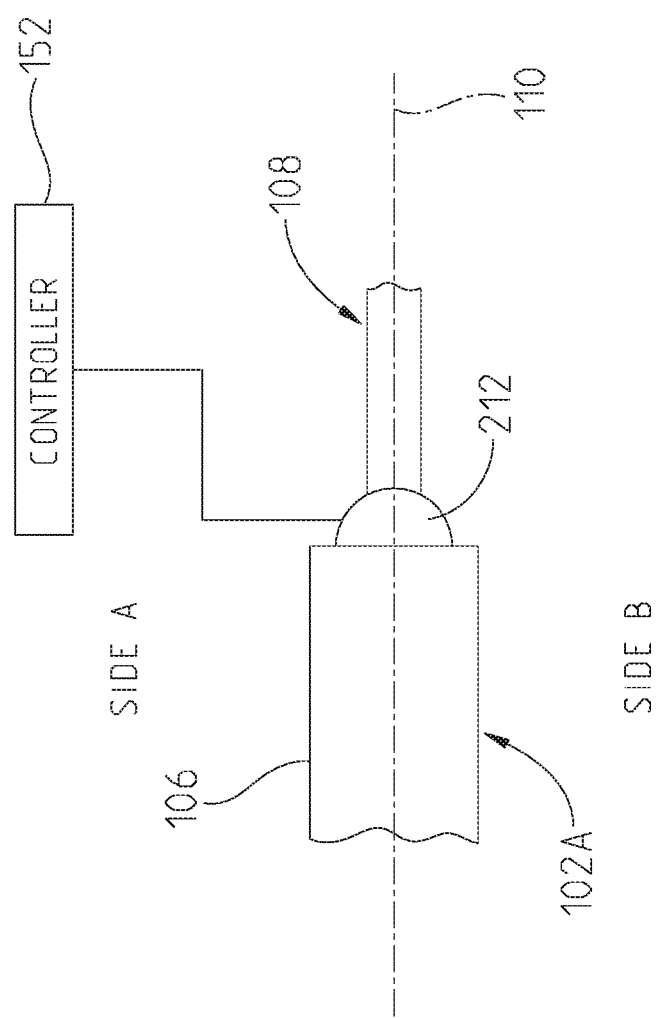
FIG. 4A is a detail view of a portion of the control system of FIG. 4.

Referring to FIGS. 4 and 4A, exemplary first monitoring system 164, second monitoring system 166, third monitoring system 168, and fourth monitoring system 170 are shown. First monitoring system 164 is an IR system and includes a first passive IR detector 200 positioned along wall 14 and a second passive IR detector 202 positioned along wall 16. Each of first passive IR detector 200 and second passive IR detector 202 monitor portions of first region 180 and provide an indication to controller 152 when a warm body enters or moves within first region 180. Similarly, second monitoring system 166 is an IR system and includes a first passive IR detector 204 positioned along wall 14 and a second passive IR detector 206 positioned along wall 16. Each of first passive IR detector 204 and second passive IR detector 206 monitor portions of second region 182 and provide an indication to controller 152 when a warm body enters or moves within second region 182. Exemplary passive IR detectors include the SAFEPATH brand system available from Gym Door Repairs located at 3500 Sunrise Highway, Building 200, Suite 210 Great River, N.Y. 11739. Further exemplary passive IR detectors include the DS720i Long Range TriTech PIR Detector (10.525 GHZ) available from Bosch Security Systems, Inc. located at 130 Perinton Parkway, Fairport, N.Y. 14450. The DS720i detector includes both passive IR detection and microwave detection systems. In one embodiment, one or more of first passive IR detector 200, second passive IR detector 202, first passive IR detector 204, and second passive IR detector 206 are positioned within the respective first region 180 and second region 182 that they are monitoring. In one embodiment, one or more of first passive IR detector 200, second passive IR detector 202, first passive IR detector 204, and second passive IR detector 206 are positioned outside of the respective first region 180 and second region 182 that they are monitoring.

Third monitoring system 168 includes a pressure sensitive mat 210 positioned in pocket 120. Pressure sensitive mat 210 includes pressure sensors which detect when a load above a predetermined threshold is positioned on pressure sensitive mat 210. Pressure sensitive mat 210 is spaced apart from movable wall system 100 so that movable wall system 100 does not exert a load on pressure sensitive mat 210. If pressure sensitive mat 210 detects a load above the predetermined threshold, an indication is provided to controller 152. An exemplary pressure sensitive mat 210 is MS-Series safety mats available from Tapeswitch Corporation located at 100 Schmitt Boulevard in Farmingdale, N.Y. 11735.

Fourth monitoring system 170 includes a pressure sensitive edge 212 (see FIG. 4A) carried by a leading edge of lead panel 102A. Pressure sensitive edge 212 includes pressure sensors which detect when a load above a predetermined threshold contacts pressure sensitive edge 212. If pressure sensitive edge 212 detects a load above the predetermined threshold, an indication is provided to controller 152. An exemplary pressure sensitive edge 212 is sensing edge product available from Tapeswitch Corporation located at 100 Schmitt Boulevard in Farmingdale, N.Y. 11735.

Figure 6:
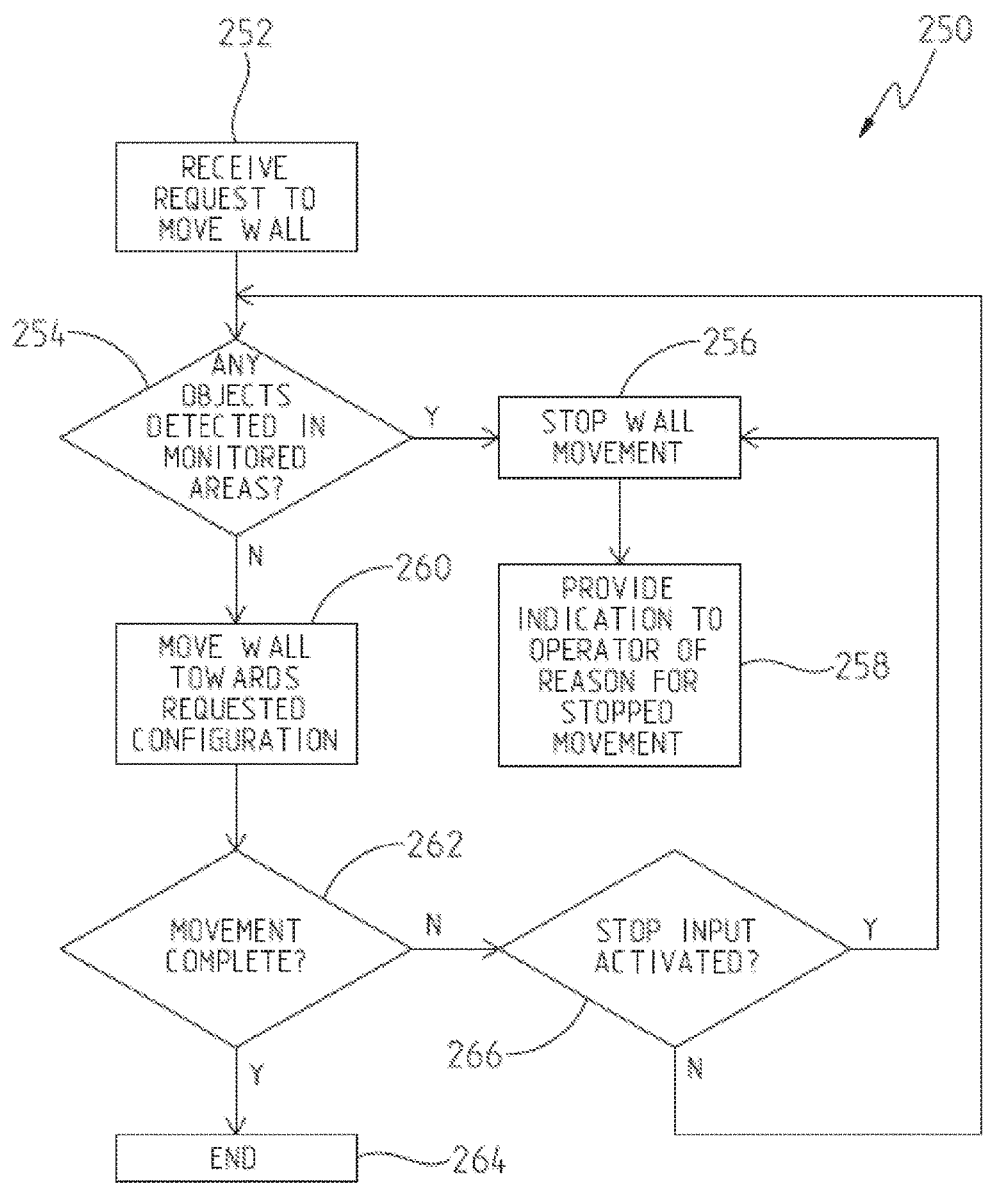
FIG. 6 illustrates an exemplary processing sequence of a controller of the control system of FIG. 3.

Referring to FIG. 6, an exemplary processing sequence 250 of controller 152 is illustrated for the system illustrated in FIG. 4. Controller 152 receives a request to move movable wall system 100, as represented by block 252. The request is provided as an indication from operator interface 158 based on an input from an operator. Exemplary operator inputs are discussed herein in reference to FIGS. 8-20.

Controller 152 next determines if any objects are detected in one of first region 180, second region 182, third region 184, and fourth region 186, as represented by block 254. If any one of first monitoring system 164, second monitoring system 166, third monitoring system 168, or fourth monitoring system 170 provides an indication of the presence of an object in the respective one of first region 180, second region 182, third region 184, and fourth region 186, controller 152 fails to initiate wall movement (if the wall 100 is not moving) or stops the wall movement (if the wall 100 is moving), as represented by block 256. Exemplary indications include a change in a voltage output on a line monitored by controller 152, a message sent over a network connection, such as a CAN network or a BLUETOOTH wireless network, or other suitable methods of providing an indication. Controller 152 then provides an indication to an operator of the stopped movement, as represented by block 258. Exemplary indications include audio indicators (for example, a siren, an audio tone, or other suitable audio indicators), visual indicators (for example, a flashing light, a pictorial or textual message on a display, or other suitable visual indicators), tactile indicators (a vibration element or other suitable tactile indicators), or combinations thereof.

If an object is not detected in any one of first region 180, second region 182, third region 184, and fourth region 186, controller 152 activates drive system 130 to move movable wall system 100 towards the requested configuration, as represented by block 260. Controller 152 determines if the movement is complete, as represented by block 262. In one embodiment, controller 152 determines the movement is complete when the respective limit switch is activated (switch 160 for placing movable wall system 100 in an extended configuration and switch 162 for placing movable wall system 100 in a retracted configuration).

If the wall movement is complete, the processing sequence ends, as represented by block 264. Otherwise, controller 152 determines if a stop input has been received, as represented by block 266. If a stop input has been received, controller 152 stops the wall movement, as represented by block 256. If a stop input has not been received, controller 152 returns to block 254 to monitor for objects in any one of first region 180, second region 182, third region 184, and fourth region 186, as represented by block 254.

Figure 8:
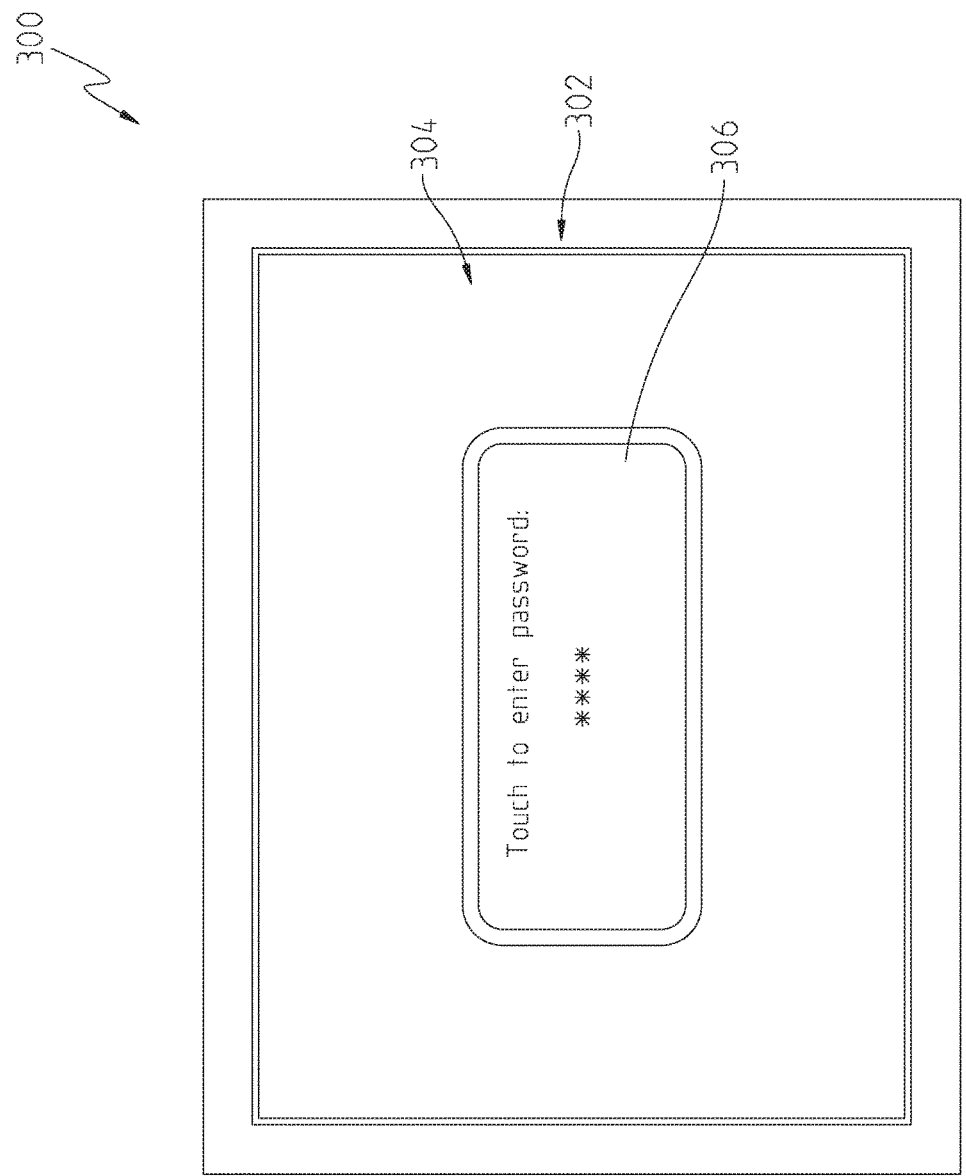
FIG. 8 illustrates an exemplary login screen of an exemplary touch screen operator interface.
Figure 9:
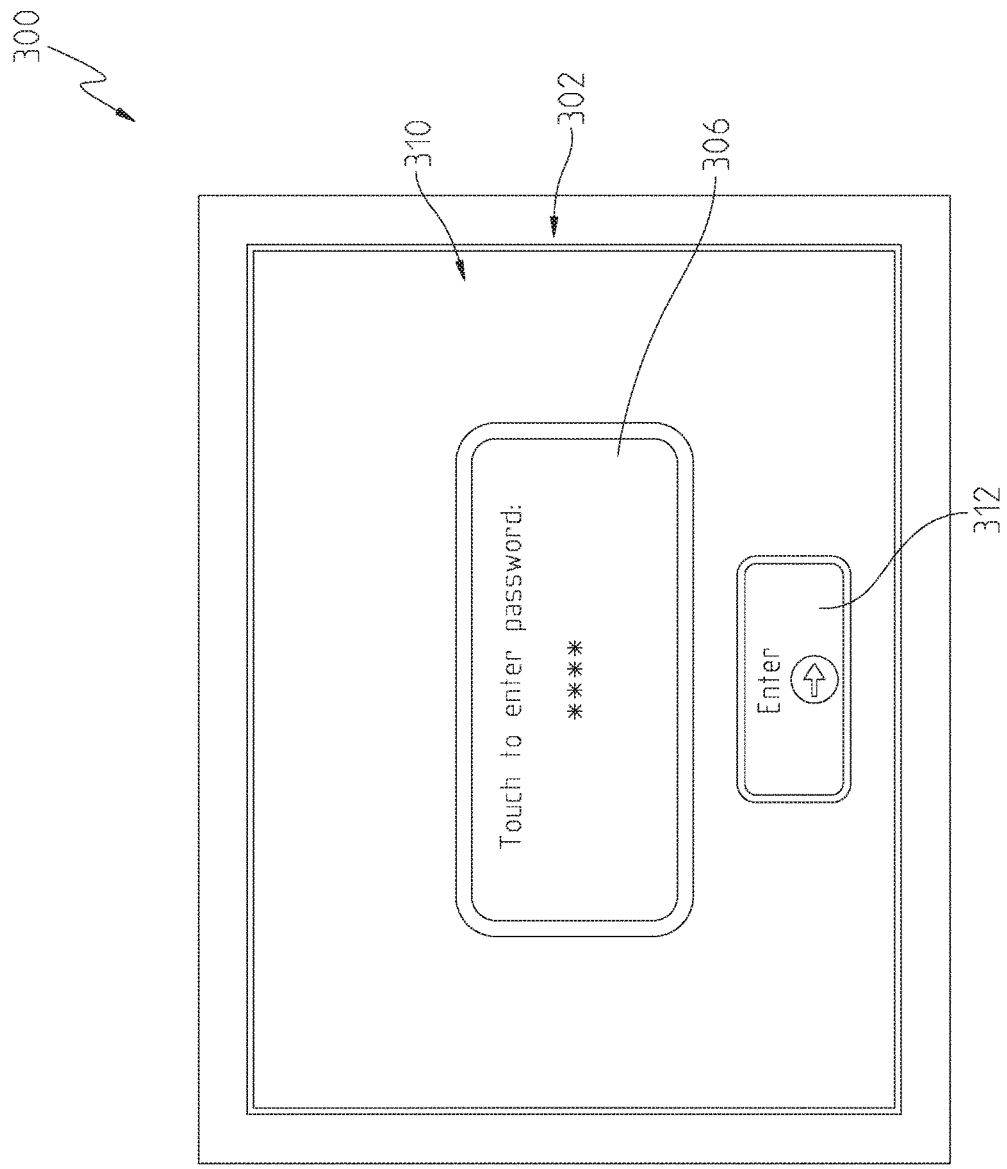
FIG. 9 illustrates an exemplary password submit screen of the exemplary touch screen operator interface.

In one embodiment, operator interface 158 includes a touch screen unit 300 (see FIG. 8) having a touch screen 302. In FIG. 8, an initial screen layout 304 is illustrated. When an operator touches touch screen 302, screen 304 prompts the operator to enter a password. To initiate entering a password, operator touches password entry region 306. In response thereto, the operator is presented with a numeric keypad layout (not shown) through which the operator may enter a password by selecting the touch regions corresponding to the desired numbers. In one example, the password is a four digit number. Once the password has been entered, screen 310 (see FIG. 9) is displayed. Screen 310 includes password entry region 306 and an enter touch region 312. In response to a selection of region 312, controller 152 determines if the entered password is valid. If the password is valid, screen 320 (see FIG. 10) is displayed.

Figure 10:
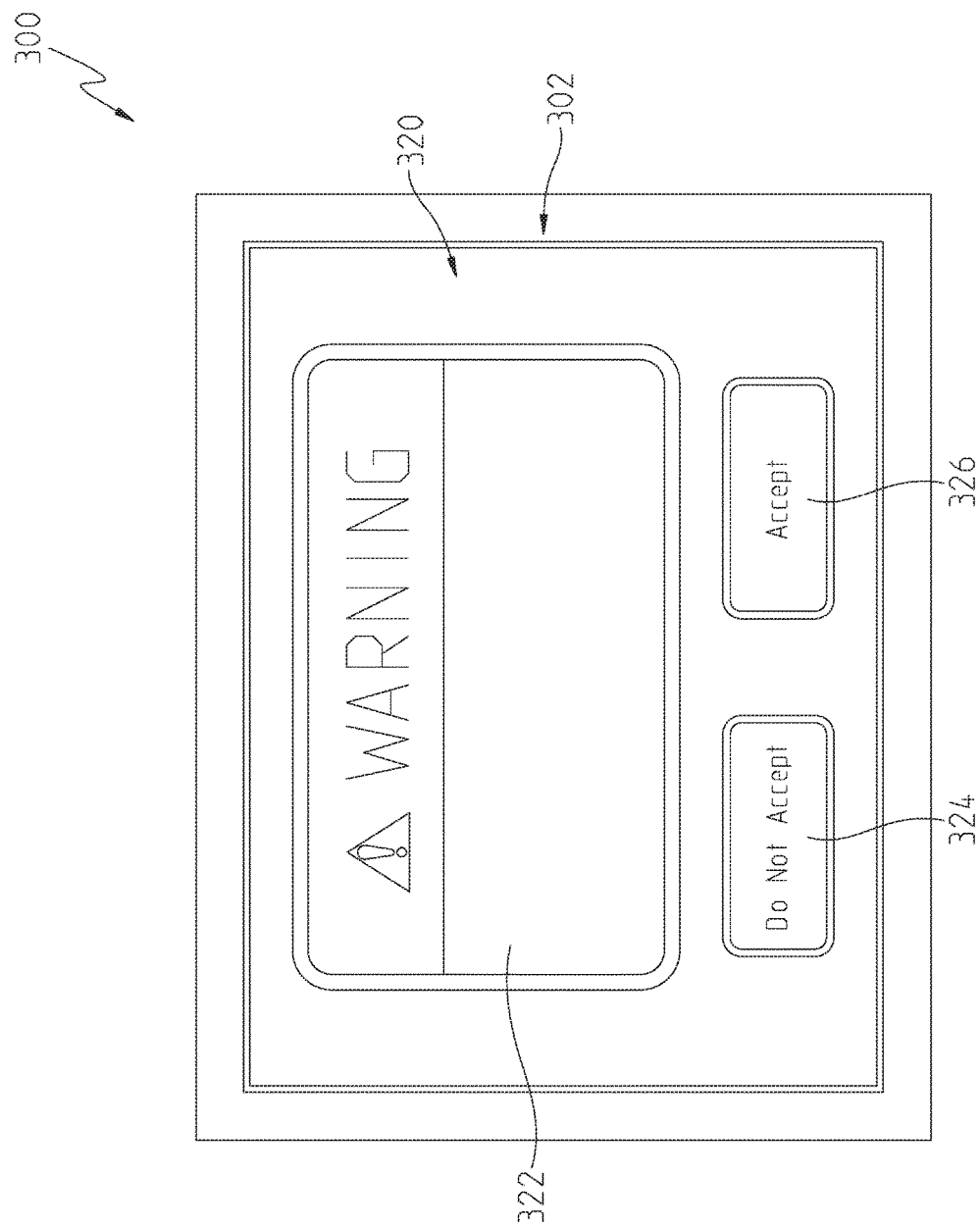
FIG. 10 illustrates an exemplary warning screen of the exemplary touch screen operator interface.

Referring to FIG. 10, screen 320 includes an instructional box 322, a decline touch region 324, and an accept touch region 326. Instructional box 322 provides instructions and warnings regarding the operation of movable wall system 100. In one embodiment, instructions box 322 is a scroll box. The operator must acknowledge the instructions and warnings provided in instructional box 322 prior to operating wall 100. If the operator does not agree to comply with the instructions and warnings, the operator selects decline touch region 324 which results in screen 304 (see FIG. 8) being displayed. If the operator agrees to comply with the instructions and warnings, the operator selects accept touch region 326 which results in screen 330 (see FIG. 11) being displayed.

Figure 11:
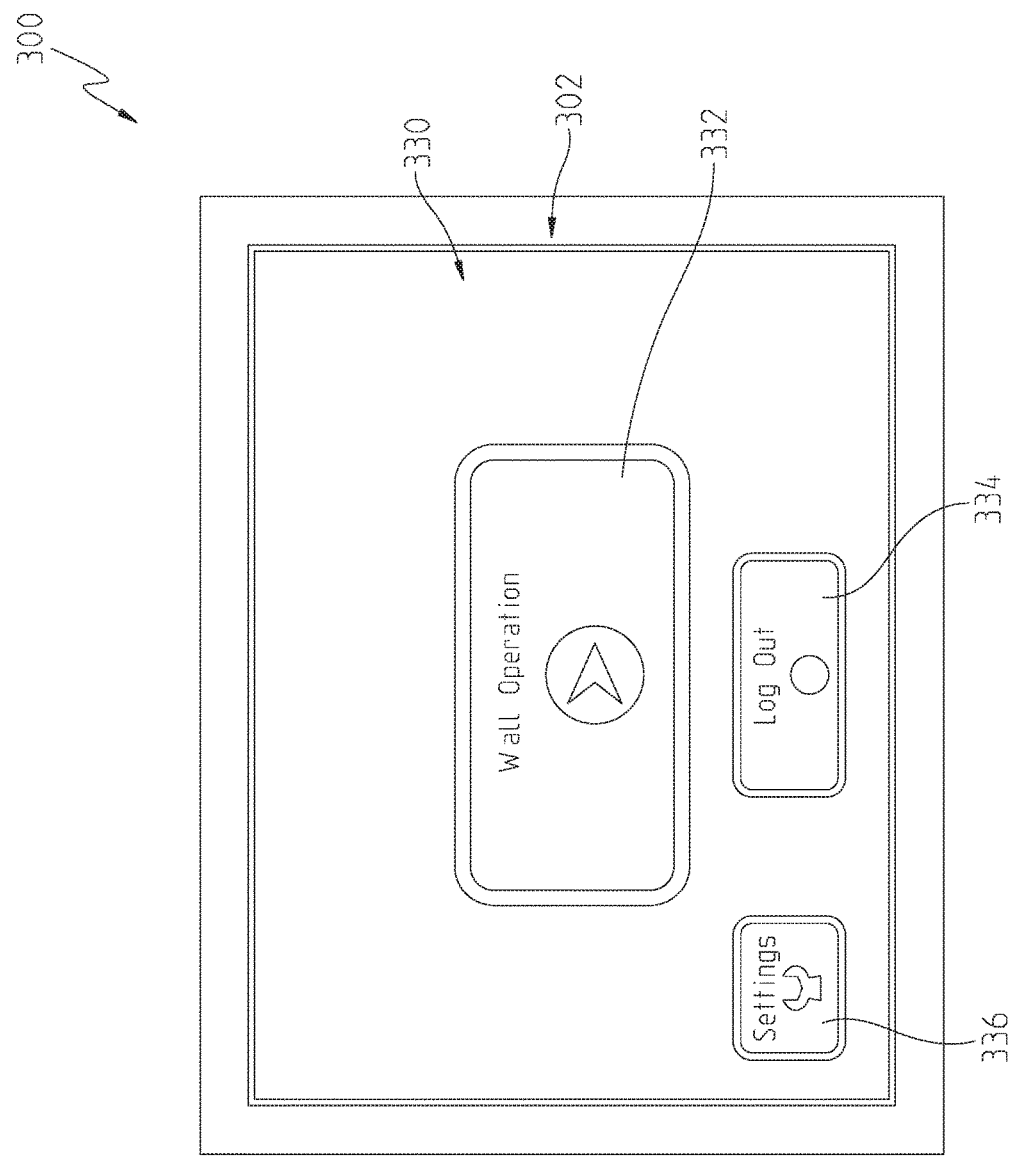
FIG. 11 illustrates an exemplary home screen of the exemplary touch screen operator interface.

Referring to FIG. 11, a wall operation touch region 332 is included in screen 330. Further, a log out touch region 334 is provided. Touching log out touch region 334 results in screen 304 (see FIG. 8) being displayed. Screen 330 also includes a setting touch input 336. In order to change the settings, the entered password must have administrative privileges. Touching wall operation touch region results in screen 340 (see FIG. 12) being displayed.

Figure 12:
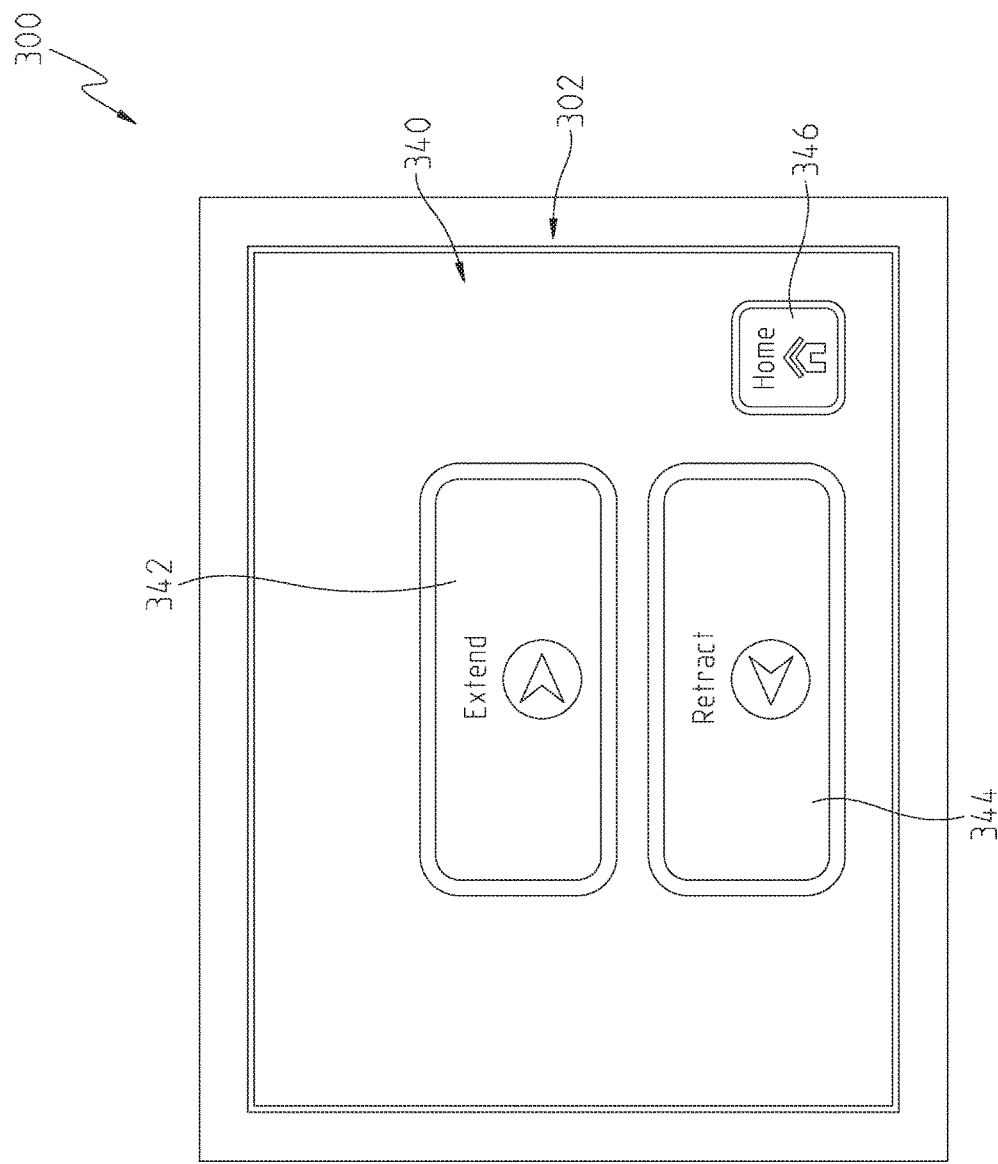
FIG. 12 illustrates an exemplary movement selection screen of the exemplary touch screen operator interface.

Referring to FIG. 12, screen 340 includes an extend wall touch region 342, a retract wall touch region 344, and a home screen touch region 346. Touching home screen touch region returns the operator to screen 330 (see FIG. 11). Touching extend wall touch region 342 results in screen 350 (see FIG. 15) being displayed. Touching retract wall touch region 344 results in screen 360 (see FIG. 16) being displayed.

Figure 15:
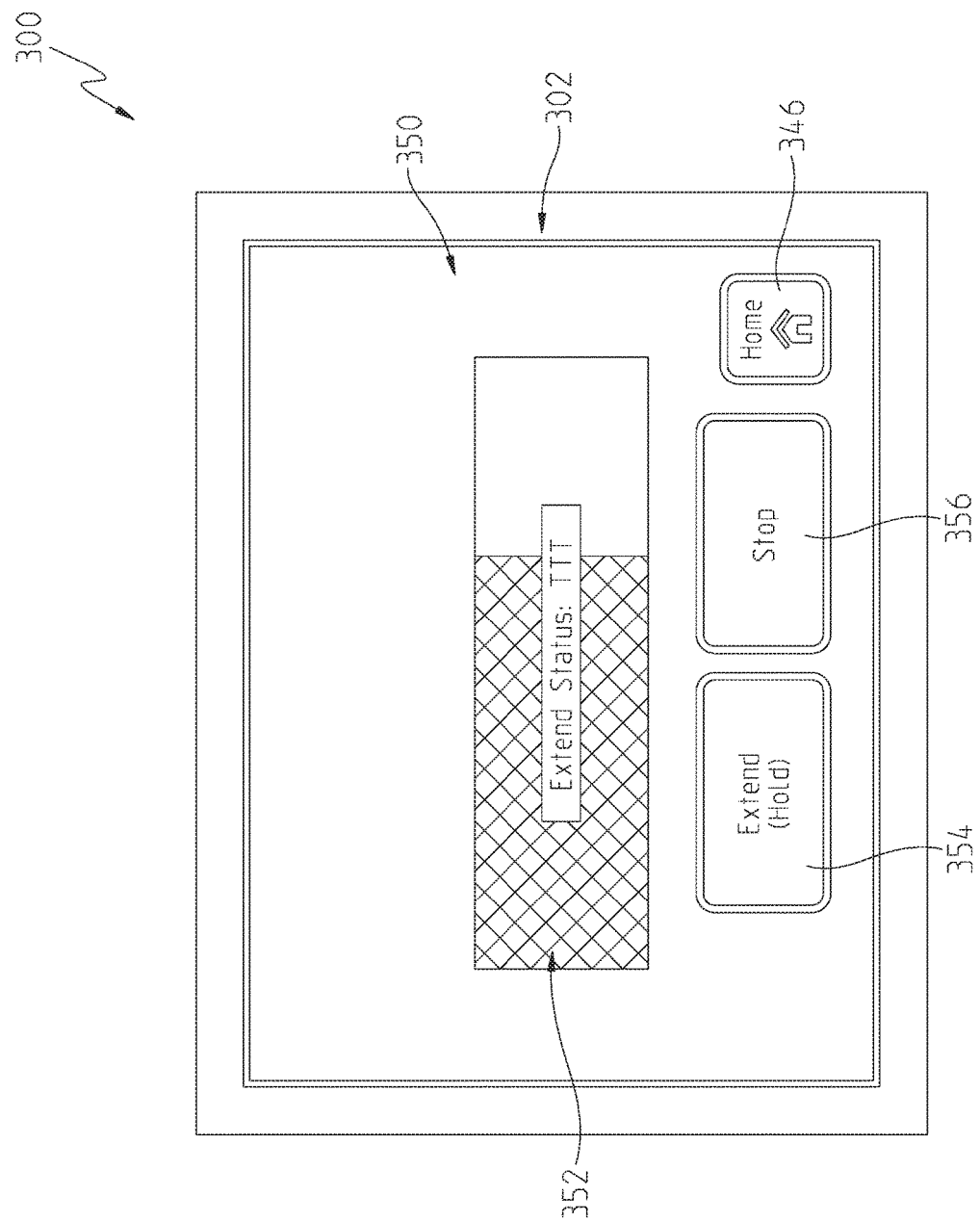
FIG. 15 illustrates an exemplary extend movement screen of the exemplary touch screen operator interface.

Referring to FIG. 15, screen 350 includes an extend status indicator 352, an extend request touch region 354, a stop wall movement request touch region 356, and home screen touch region 346. Extend status indicator 352 provides a visual indication of the percentage of completion of the requested wall movement.

In one embodiment, an operator by touching extend request touch region 354 for a predetermined period of time results in controller 152 executing processing sequence 250. An exemplary predetermined period of time is about three seconds. An operator may stop the movement of the wall 100 by touching stop wall movement request touch region 356 which is interpreted by controller 152 a stop input (see block 266) in processing sequence 250.

In another embodiment, an operator must continuously touch extend request touch region 354 throughout the movement of wall 100. As long as the operator is touching extend request touch region 354, controller 152 executes processing sequence 250. If the operator ceases to touch extend request touch region 354, controller interprets this as a stop input (see block 266) in processing sequence 250.

Figure 18:
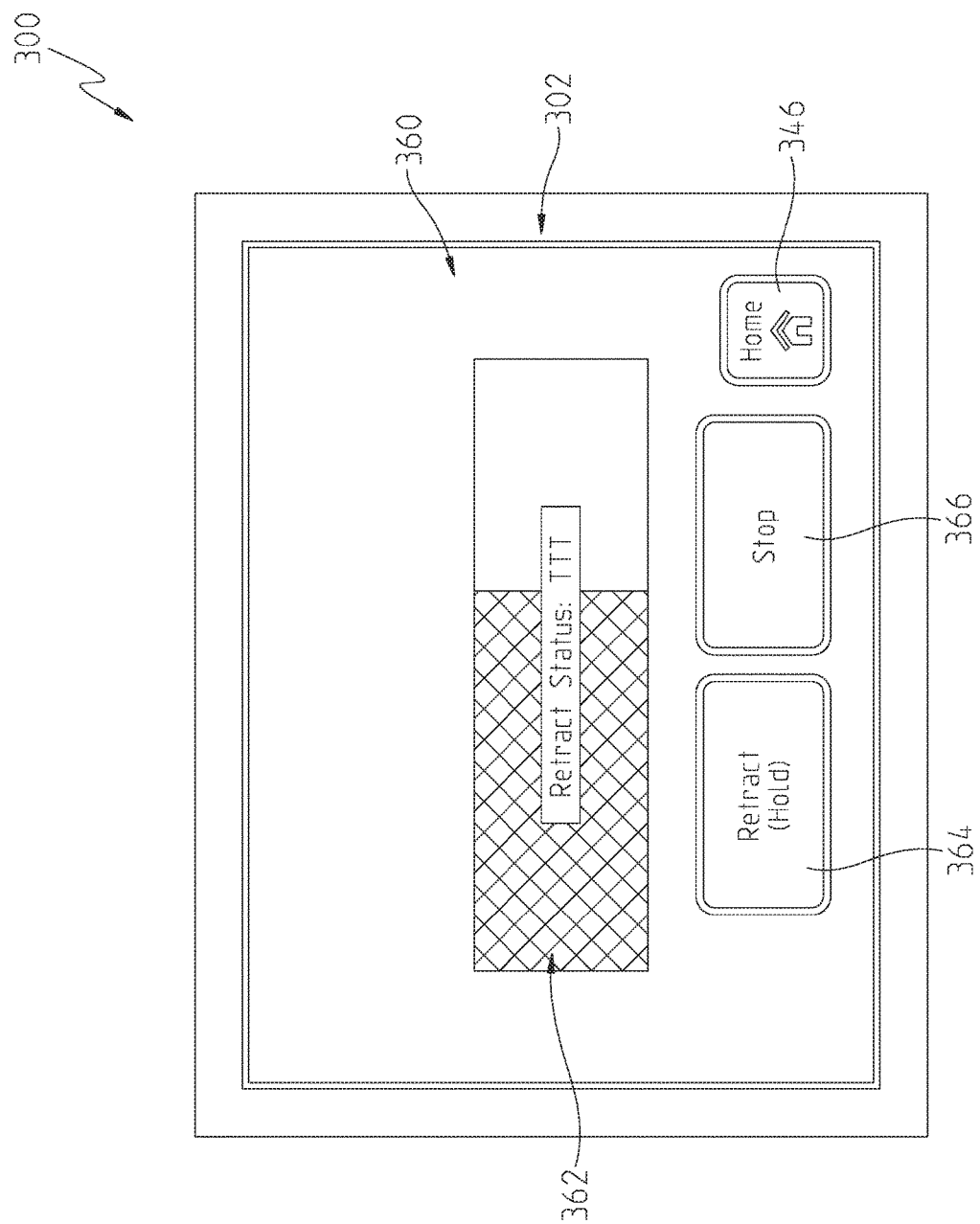
FIG. 18 illustrates an exemplary retract movement screen of the exemplary touch screen operator interface.

Referring to FIG. 18, screen 360 includes a retract status indicator 362, a retract request touch region 364, a stop wall movement request touch region 366, and home screen touch region 346. Retract status indicator 362 provides a visual indication of the percentage of completion of the requested wall movement.

In one embodiment, an operator by touching retract request touch region 364 for a predetermined period of time results in controller 152 executing processing sequence 250. An exemplary predetermined period of time is about three seconds. An operator may stop the movement of the wall 100 by touching stop wall movement request touch region 366 which is interpreted by controller 152 a stop input (see block 266) in processing sequence 250.

In another embodiment, an operator must continuously touch retract request touch region 364 throughout the movement of wall 100. As long as the operator is touching retract request touch region 364, controller 152 executes processing sequence 250. If the operator ceases to touch retract request touch region 364, controller interprets this as a stop input (see block 266) in processing sequence 250.

Figure 5:
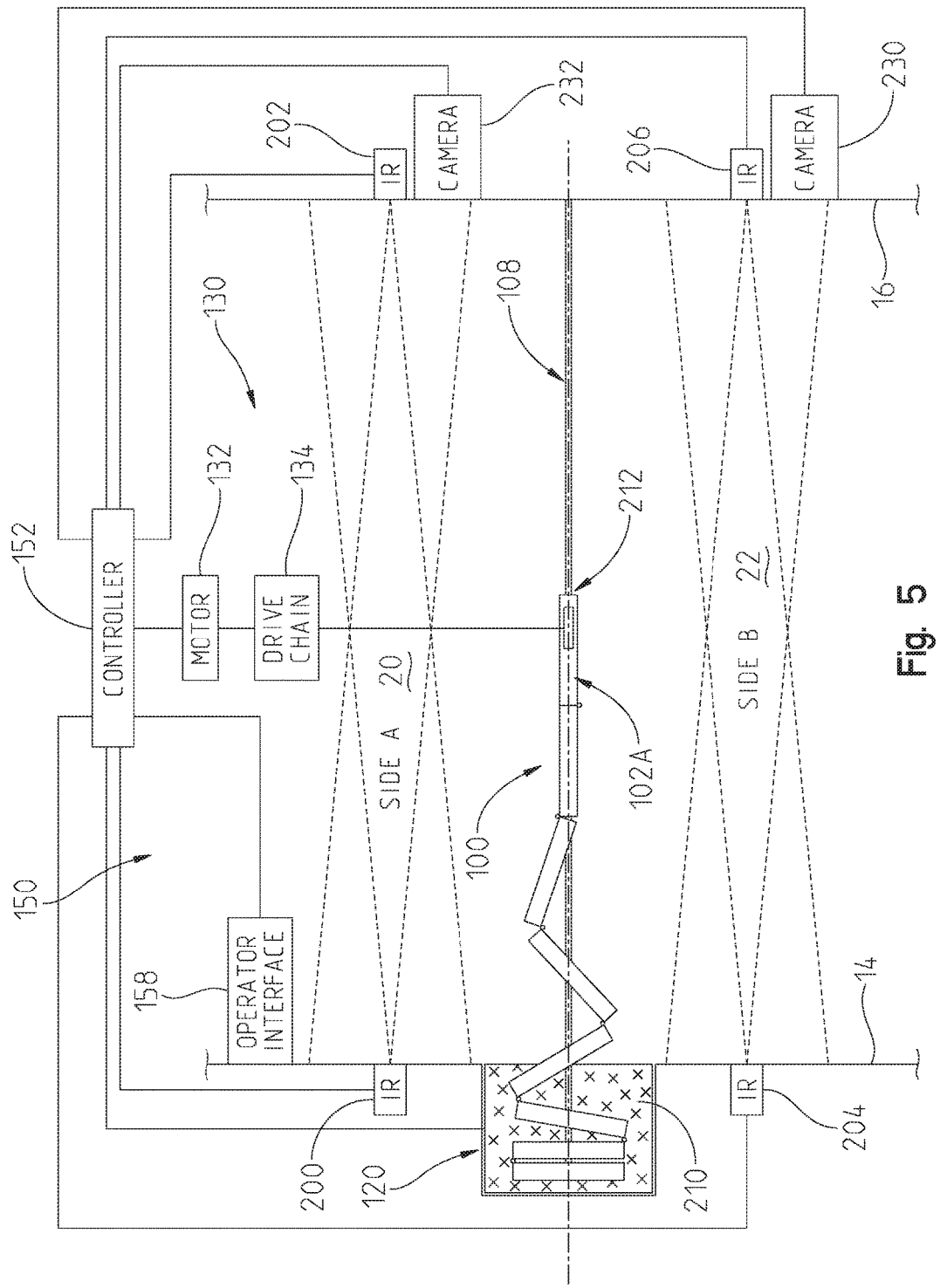
FIG. 5 illustrates another exemplary embodiment of the control system of FIG. 3.

Referring to FIG. 5, the system of FIG. 4 has been modified to further include a first video camera 230 positioned to monitor region 182 and, optionally, a second video camera 232 positioned to monitor region 180. Although video cameras 230 and 232 are shown positioned along wall 16, one or both of video camera 230 and video camera 232 may be positioned along wall 14 or in the ceiling of room 12.

By having video camera 230, controller 152 may provide video information to an operator of wall 100 through operator interface 158 of side 22 of wall 100. Thus, an operator positioned at operator interface 158 on side 20 of wall 100 may visually inspect side 20 of wall directly and visually inspect side 22 of wall 100 indirectly through the video output of video camera 230. By having both video camera 230 and video camera 232, controller 152 may provide video information to an operator of wall 100 through operator interface 158 of both side 20 and side 22 of wall 100. Thus, an operator positioned at operator interface 158 on side 20 of wall 100 may visually inspect side 20 of wall both directly and indirectly and visually inspect side 22 of wall 100 indirectly through the video output of video camera 230.

In one embodiment, controller 152 retains the video information from cameras 230, 232. In one embodiment, the video information is provided to the operator solely for visual inspection. In one embodiment, the video information is both provided to the operator for visual inspection and analyzed by controller 152 to detect an object in either monitoring region 180 or monitoring region 182. For example, controller 152 through image processing may detect movement of objects within either monitoring region 180 or monitoring region 182 through the analysis of multiple frames of video information. Although video cameras are shown to monitor one or both of monitoring region 180 and monitoring region 182, video cameras may also be included to monitor one or both of monitoring region 184 and monitoring region 186.

Figure 7:
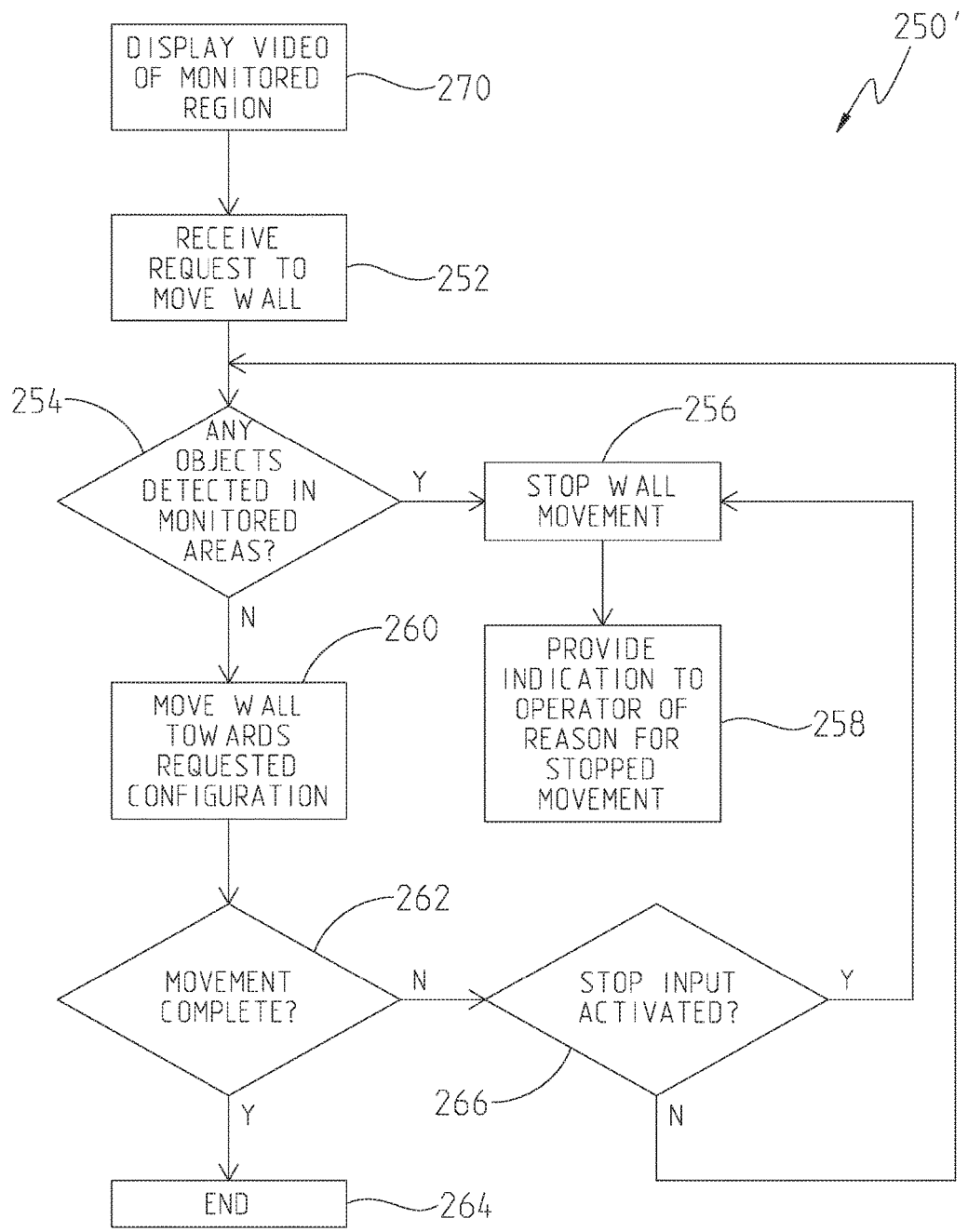
FIG. 7 illustrates another exemplary processing sequence of a controller of the control system of FIG. 3.

Referring to FIG. 7, a modified version of processing sequence 250' is shown. Processing sequence 250' further includes the step of displaying the video output of the video cameras on operator interface 158, as represented by block 270.

Figure 13:
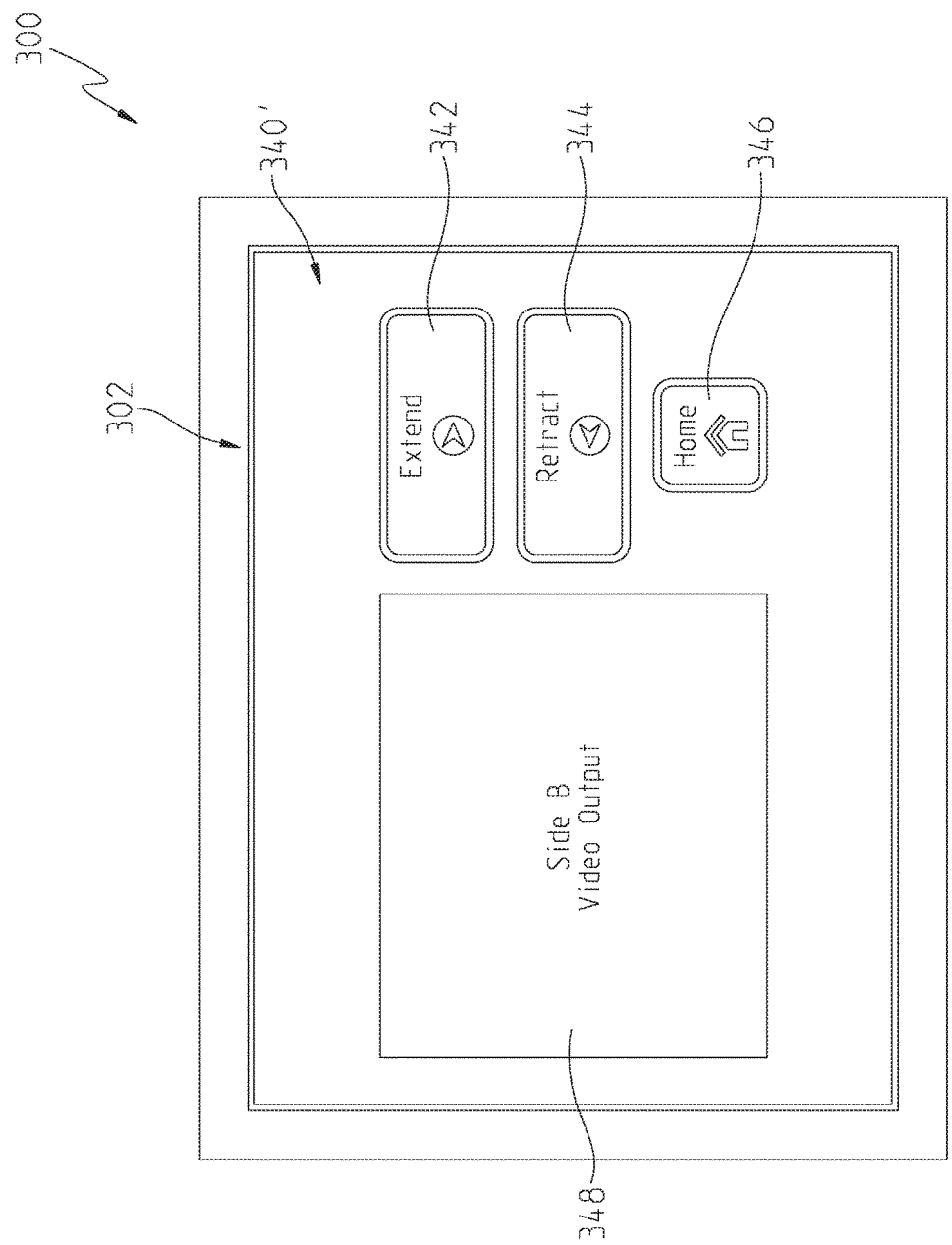
FIG. 13 illustrates an exemplary movement selection screen of the exemplary touch screen operator interface including a video window.
Figure 14:
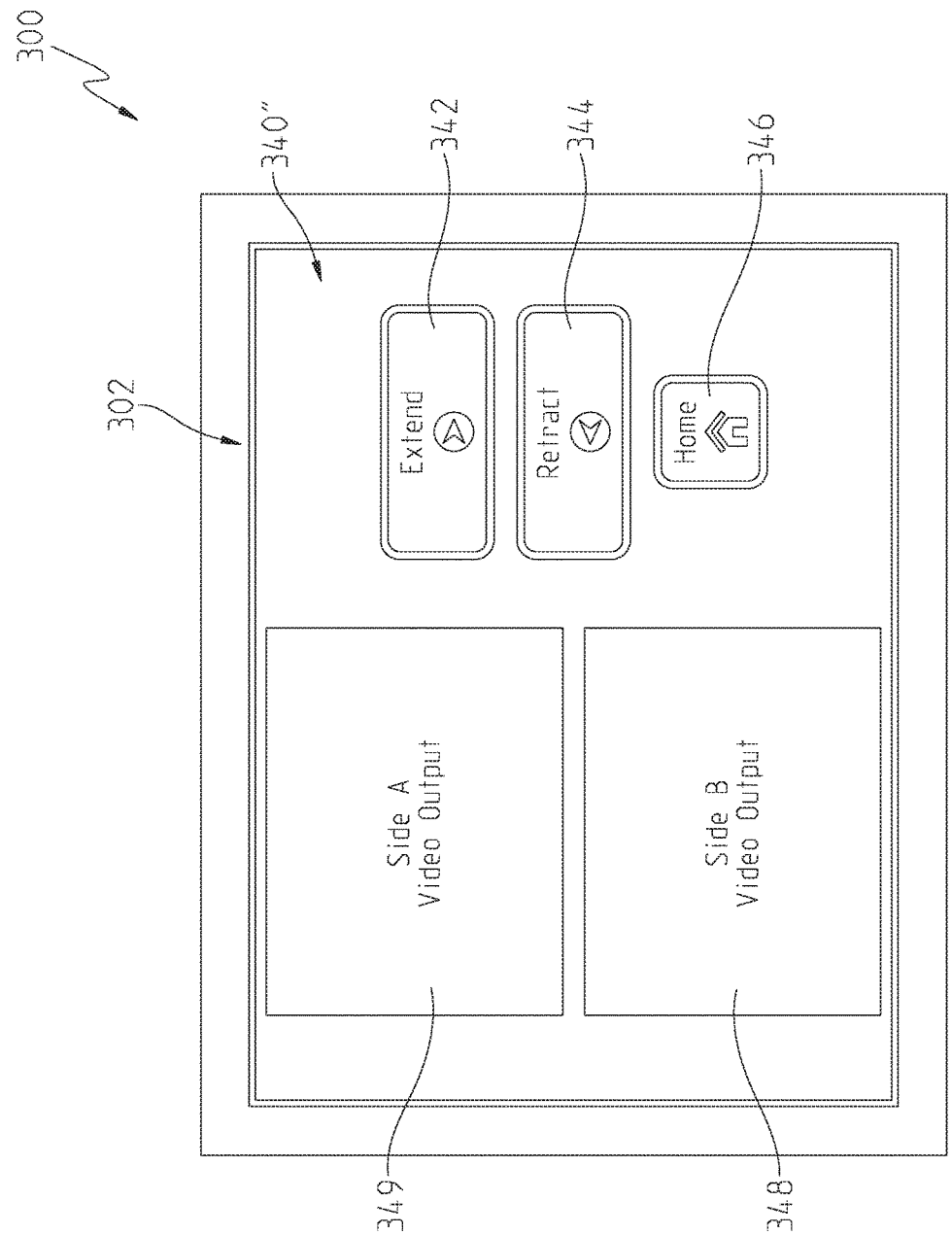
FIG. 14 illustrates an exemplary movement selection screen of the exemplary touch screen operator interface including a plurality of video windows.

Referring to FIG. 13, a modified screen 340' of touch screen unit 300 is shown which includes a region 348 which displays the video output of video camera 230. Referring to FIG. 14, a modified screen 340" of touch screen unit 300 is shown which includes a region 348 which displays the video output of video camera 230 and a region 349 which displays the video output of video camera 232.

Figure 16:
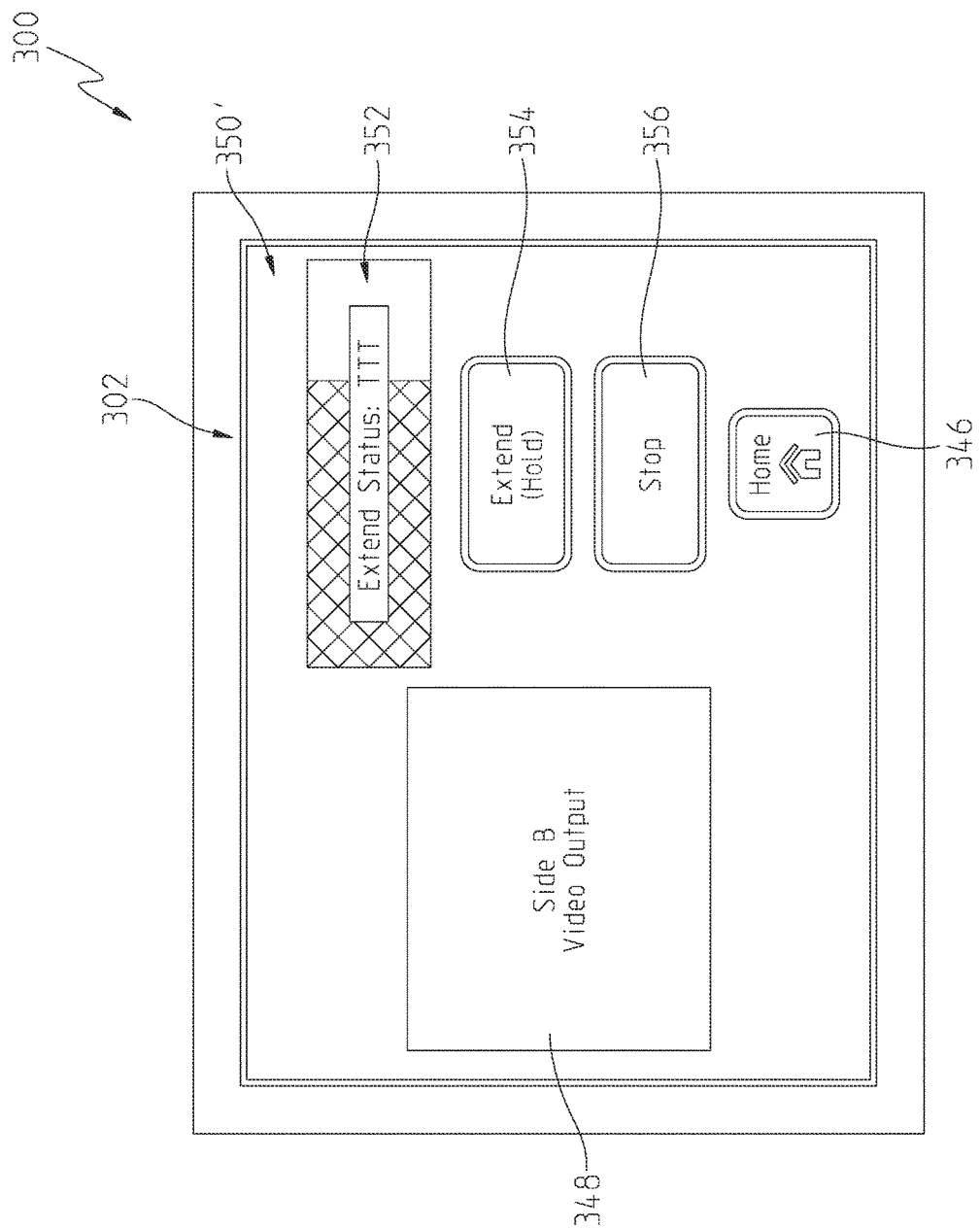
FIG. 16 illustrates an exemplary extend movement screen of the exemplary touch screen operator interface including a video window.
Figure 17:
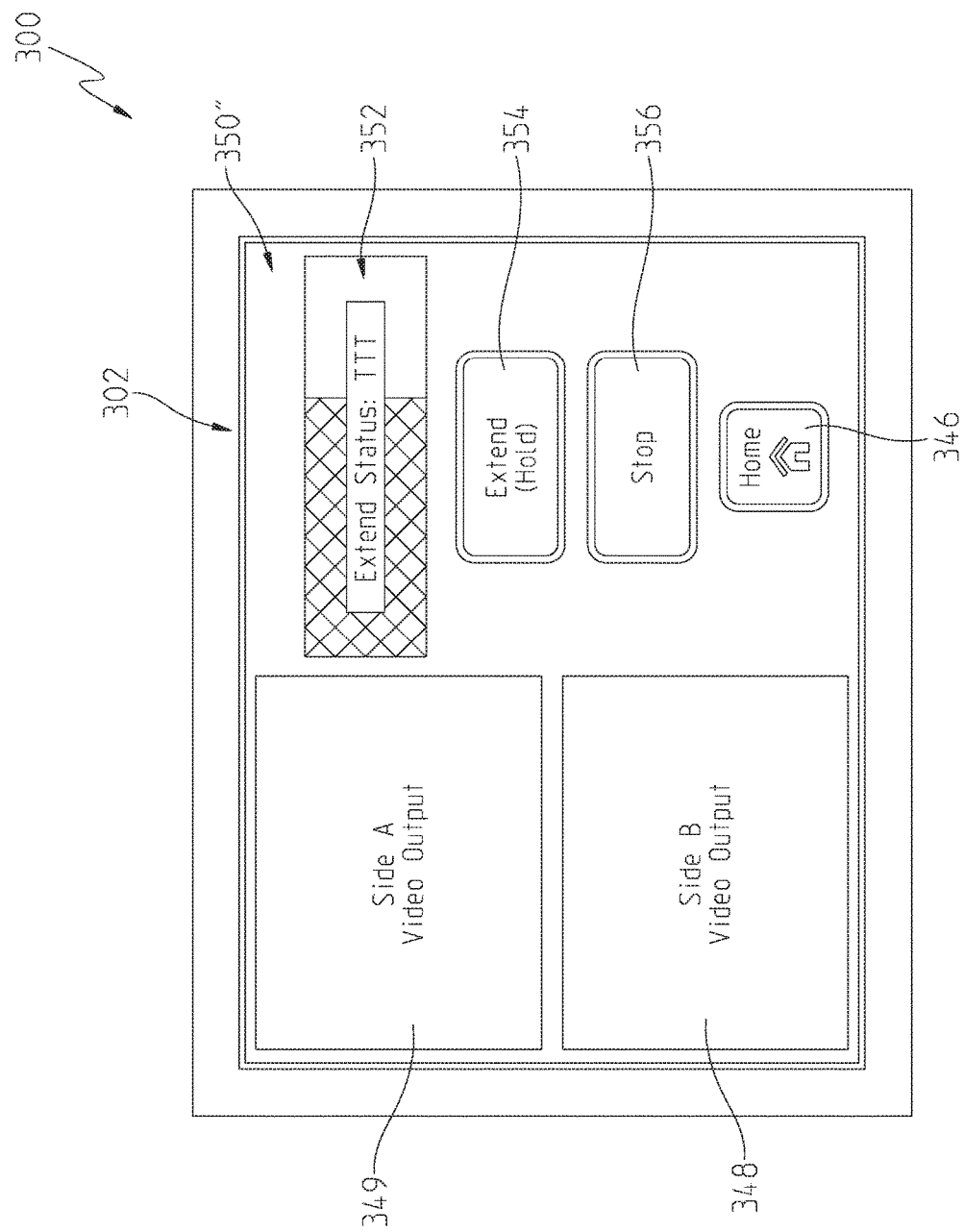
FIG. 17 illustrates an exemplary extend movement screen of the exemplary touch screen operator interface including a plurality of video windows.

Referring to FIG. 16, a modified screen 350' of touch screen unit 300 is shown which includes a region 348 which displays the video output of video camera 230. Referring to FIG. 17, a modified screen 350" of touch screen unit 300 is shown which includes a region 348 which displays the video output of video camera 230 and a region 349 which displays the video output of video camera 232.

Figure 19:
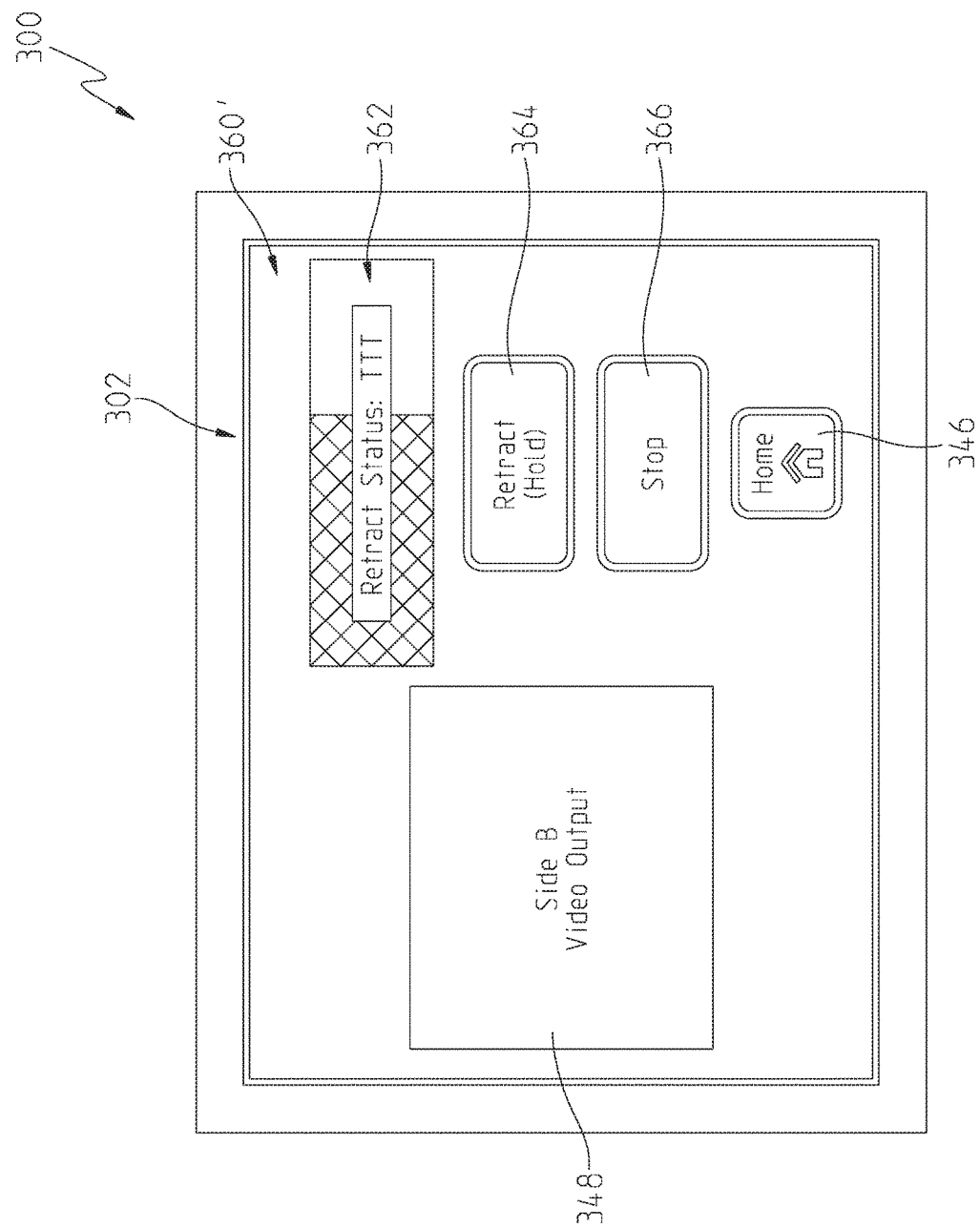
FIG. 19 illustrates an exemplary retract movement screen of the exemplary touch screen operator interface including a video window.
Figure 20:
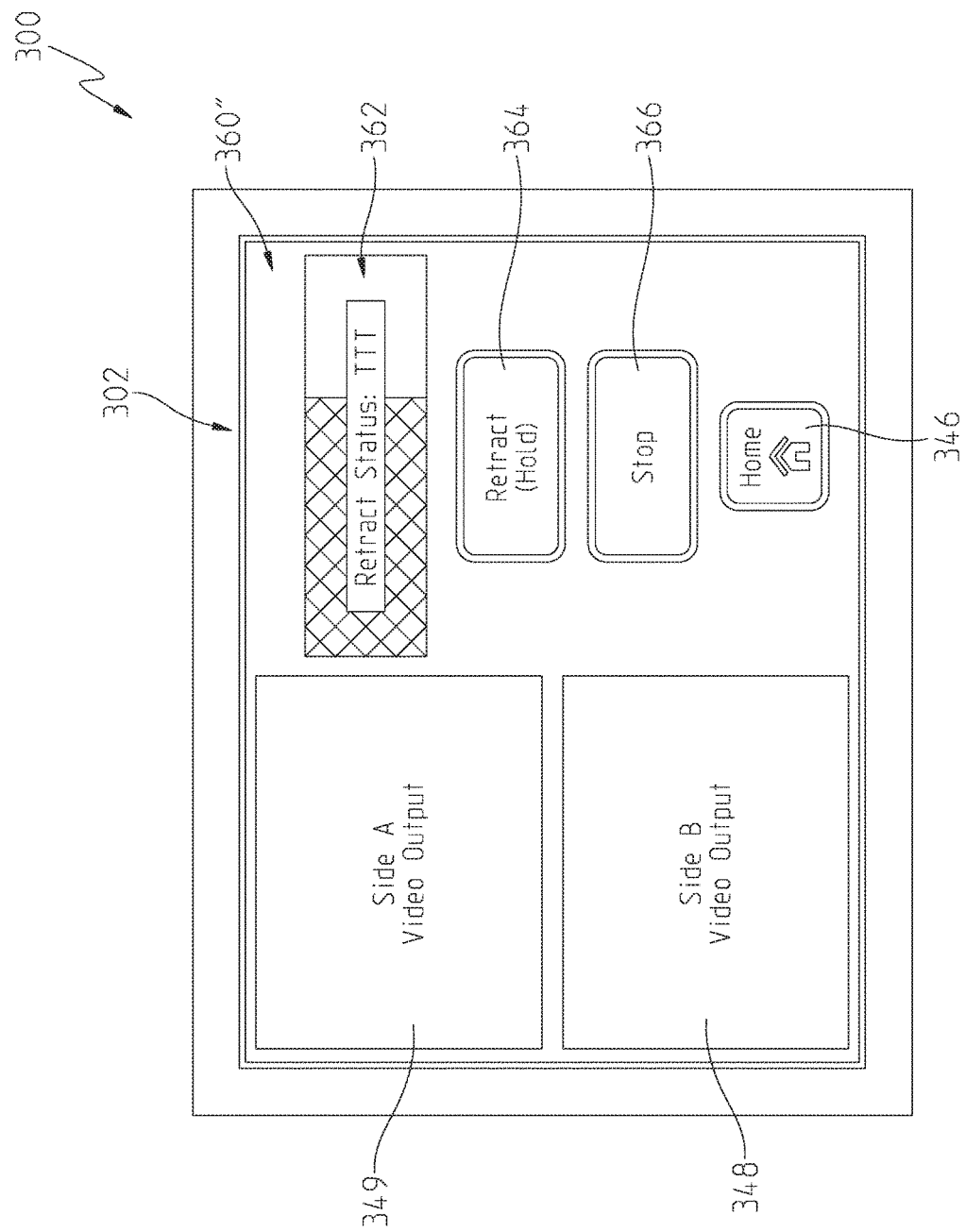
FIG. 20 illustrates an exemplary retract movement screen of the exemplary touch screen operator interface including a plurality of video windows.

Referring to FIG. 19, a modified screen 360' of touch screen unit 300 is shown which includes a region 348 which displays the video output of video camera 230. Referring to FIG. 20, a modified screen 360" of touch screen unit 300 is shown which includes a region 348 which displays the video output of video camera 230 and a region 349 which displays the video output of video camera 232.

While this disclosure has been described as having exemplary designs and embodiments, the present systems and methods may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A system which monitors for an object adjacent a movable wall panel system suspended from an overhead track, the monitoring system comprising:
    a plurality of wall panels rotatably coupled together and each including a first end and a second end, spaced-apart from the first end, and a panel face extending between the first end and the second end, the plurality of wall panels being movable between an extended configuration wherein the panel faces of the plurality of wall panels are generally coplanar with a wall plane and a retracted configuration wherein the panel faces of the plurality of wall panels are transverse to the wall plane;
    a drive system coupled to at least one of the plurality of wall panels and configured to move the plurality of wall panels along the overhead track to one of the extended configuration and the retracted configuration; and
    a control system coupled to the drive system to control the drive system to move the plurality of wall panels to one of the extended configuration and the retracted configuration and to deactivate the drive system, the control system comprising:
        at least one monitoring system positioned to monitor at least one area adjacent the plurality of wall panels on a first side of the wall plane, the at least one monitoring system adapted to detect the object in the least one area, the at least one monitoring system providing a monitoring output indicating the detection of the object in the least one area;
        an operator interface positioned on a second side of the wall plane, the operator interface capable of receiving a request to move the plurality of wall panels to one of the extended configuration and the retracted configuration, the operator interface providing a request output indicating the request to move the plurality of wall panels to one of the extended configuration and the retracted configuration; and
        a controller operatively coupled to the at least one monitoring system to receive the monitoring output and the operator interface to receive the request output, the controller activating the drive system based on the request output and the monitoring output and deactivating the drive system based on the monitoring output, the operator interface including a touch screen interface;
    wherein the panel faces of the plurality of wall panels are vertically extending along a longitudinal direction in both the extended configuration and the retracted configuration.

2. The system of claim 1, wherein the operator interface includes a first touch input, the operator interface providing an extend request output to extend the plurality of wall panels in response to a detection of a touch of the first touch input for at least a predetermined period of time.

3. The system of claim 1, wherein the operator interface includes a first touch input, the operator interface providing an extend request output to extend the plurality of wall panels in response to a detection of a touch of the first touch input and a stop request output in response to a detection of an absence of the touch of the first touch input.

4. The system of claim 1, wherein the operator interface includes a second touch input, the operator interface providing a retract request output to retract the plurality of wall panels in response to a detection of a touch of the second touch input for at least a predetermined period of time.

5. The system of claim 1, wherein the operator interface includes a second touch input, the operator interface providing a retract request output to retract the plurality of wall panels in response to a detection of a touch of the second touch input and a stop request output in response to a detection of an absence of the touch of the second touch input.

6. The system of claim 1, wherein the operator interface is completely positioned on the second side of the wall plane.

7. The system of claim 1, wherein the operator interface includes a first unit having a touch screen positioned on the first side of the wall plane and a second unit having a second touch screen positioned on the second side of the wall plane, the first unit and the second unit each being operatively coupled to the controller, the controller operating the drive system based on either a first request output from the first unit or a second request output from the second unit.

8. The system of claim 1, wherein the at least one monitoring system includes a first monitoring system positioned to monitor a first area on the first side of the wall plane, the first monitoring system including a video camera.

9. The system of claim 8, wherein a video output of the video camera is displayed at the operator interface positioned on the second side of the wall plane.

10. The system of claim 1, wherein the at least one monitoring system includes a first monitoring system positioned to monitor a first area on the first side of the wall plane and a second monitoring system positioned to monitor a second area on the second side of the wall plane, the first monitoring system including a first video camera and the second monitoring system including a second video camera.

11. The system of claim 10, wherein a first video output of the first video camera and a second video output of the second video camera are displayed at the operator interface positioned on the second side of the wall plane.

12. The system of claim 1, wherein the operator interface includes a third touch input, the operator interface providing a stop request output to stop movement of the plurality of wall panels in response to a detection of a touch of the third touch input for at least a predetermined period of time.

13. The system of claim 1, wherein the operator interface is activated through receipt of a user specific input.

14. The system of claim 13, wherein the user specific input is a password entered through the touch screen.

15. The system of claim 13, wherein the operator interface is deactivated after a predetermined period of time of inactivity.

16. The system of claim 1, wherein the touch screen is configured to present a plurality of screen layouts, a first screen layout of the plurality of screen layouts being capable of receiving a user specific input and in response to the controller determining the user specific input is valid, the touch screen interface displays a second screen layout of the plurality of screen layouts, the second screen layout including a wall movement request touch region, the operator interface providing the request output in response to a selection of the wall movement request touch region.

17. The system of claim 1, wherein the request output is received by the controller only from the operator interface positioned on the second side of the wall plane.

18. A system which monitors for an object adjacent a movable wall panel system suspended from an overhead track, the monitoring system comprising:
  a plurality of wall panels rotatably coupled together and each including a first end and a second end, spaced-apart from the first end, and a panel face extending between the first end and the second end, the plurality of wall panels being movable between an extended configuration wherein the panel faces of the plurality of wall panels are generally coplanar with a wall plane and a retracted configuration wherein the panel faces of the plurality of wall panels are transverse to the wall plane;
  a drive system coupled to at least one of the plurality of wall panels and configured to move the plurality of wall panels along the overhead track to one of the extended configuration and the retracted configuration; and
  a control system coupled to the drive system to control the drive system to move the plurality of wall panels to one of the extended configuration and the retracted configuration and to deactivate the drive system, the control system comprising:
    at least one monitoring system positioned to monitor at least one area adjacent the plurality of wall panels on a first side of the wall plane, the at least one monitoring system adapted to detect the object in the least one area, the at least one monitoring system providing a monitoring output indicating the detection of the object in the least one area;
    an operator interface positioned on a second side of the wall plane, the operator interface capable of receiving a request to move the plurality of wall panels to one of the extended configuration and the retracted configuration, the operator interface providing a request output indicating the request to move the plurality of wall panels to one of the extended configuration and the retracted configuration; and
    a controller operatively coupled to the at least one monitoring system to receive the monitoring output and the operator interface to receive the request output, the controller activating the drive system based on the request output and the monitoring output and deactivating the drive system based on the monitoring output, the operator interface including a touch screen interface;
  wherein the at least one monitoring system includes a first monitoring system positioned to monitor a first area on the first side of the wall plane, a second monitoring system positioned to monitor a second area on the second side of the wall plane, a third monitoring system positioned to monitor a third area intersecting the wall plane, and a fourth monitoring system positioned to monitor a fourth area corresponding to a stacking location of the plurality of wall panels when the plurality of wall panels are in the retracted configuration.

19. A system which monitors for an object adjacent a movable wall panel system suspended from an overhead track, the monitoring system comprising:
  a plurality of wall panels rotatably coupled together and each including a first end and a second end, spaced-apart from the first end, and a panel face extending between the first end and the second end, the plurality of wall panels being movable between an extended configuration wherein the panel faces of the plurality of wall panels are generally coplanar with a wall plane and a retracted configuration wherein the panel faces of the plurality of wall panels are transverse to the wall plane;
  a drive system coupled to at least one of the plurality of wall panels and configured to move the plurality of wall panels along the overhead track to one of the extended configuration and the retracted configuration; and
  a control system coupled to the drive system to control the drive system to move the plurality of wall panels to one of the extended configuration and the retracted configuration and to deactivate the drive system, the control system comprising:
    at least one monitoring system positioned to monitor at least one area adjacent the plurality of wall panels on a first side of the wall plane, the at least one monitoring system adapted to detect the object in the least one area, the at least one monitoring system providing a monitoring output indicating the detection of the object in the least one area;
    an operator interface positioned on a second side of the wall plane, the operator interface capable of receiving a request to move the plurality of wall panels to one of the extended configuration and the retracted configuration, the operator interface providing a request output indicating the request to move the plurality of wall panels to one of the extended configuration and the retracted configuration; and
    a controller operatively coupled to the at least one monitoring system to receive the monitoring output and the operator interface to receive the request output, the controller activating the drive system based on the request output and the monitoring output and deactivating the drive system based on the monitoring output, the operator interface including a touch screen interface;
  wherein the at least one monitoring system includes a first monitoring system positioned to monitor a first area on the first side of the wall plane and a second monitoring system positioned to monitor one of a second area on the second side of the wall plane, a third area intersecting the wall plane, and a fourth area corresponding to a stacking location of the plurality of wall panels when the plurality of wall panels are in the retracted configuration.

20. The system of claim 19, wherein the second monitoring system monitors the third area and is carried by a leading wall panel of the plurality of wall panels.

* * * * *